US008448209B2

(12) United States Patent
Ward, III et al.

(10) Patent No.: US 8,448,209 B2
(45) Date of Patent: May 21, 2013

(54) SYSTEM AND METHOD FOR DISPLAYING ADVERTISEMENTS RESPONSIVE TO EPG INFORMATION

(75) Inventors: Thomas E. Ward, III, Weston, MA (US); Kenneth Hancock, Nashua, NH (US); Douglas B. Macrae, Weston, MA (US)

(73) Assignee: Gemstar Development Corporation, Los Angeles, CA (US)

( * ) Notice: Subject to any disclaimer, the term of this patent is extended or adjusted under 35 U.S.C. 154(b) by 533 days.

(21) Appl. No.: 11/894,765

(22) Filed: Aug. 20, 2007

(65) Prior Publication Data

US 2008/0127266 A1 May 29, 2008

Related U.S. Application Data

(63) Continuation of application No. 10/066,811, filed on Feb. 4, 2002, which is a continuation of application No. 09/595,216, filed on Jun. 16, 2000, now abandoned, which is a continuation of application No. 09/120,488, filed on Jul. 21, 1998, now Pat. No. 6,177,931.

(60) Provisional application No. 60/055,237, filed on Aug. 12, 1997, provisional application No. 60/068,375, filed on Dec. 22, 1997, provisional application No. 60/053,330, filed on Jul. 21, 1997, provisional application No. 60/055,761, filed on Aug. 14, 1997, provisional application No. 60/061,119, filed on Oct. 6, 1997, provisional application No. 60/071,811, filed on Jan. 20, 1998, provisional application No. 60/071,812, filed on Jan. 20, 1998, provisional application No. 60/071,882, filed on Jan. 20, 1998, provisional application No. 60/034,784, filed on Dec. 19, 1996.

(51) Int. Cl.
*H04N 5/445* (2011.01)

(52) U.S. Cl.
USPC ............... 725/46; 725/39; 725/42; 725/43; 725/47

(58) Field of Classification Search
USPC ......................................... 725/32–35, 42–45
See application file for complete search history.

(56) References Cited

U.S. PATENT DOCUMENTS 3,440,427 A 4/1969 Kammer
(Continued)

FOREIGN PATENT DOCUMENTS

AU 56198/98 7/1998
(Continued)

OTHER PUBLICATIONS

U.S. Appl. No. 09/330,792, filed Jun. 11, 1999, Knudson et al.
(Continued)

*Primary Examiner* — Pankaj Kumar
*Assistant Examiner* — Timothy Newlin
(74) *Attorney, Agent, or Firm* — Ropes & Gray LLP

(57) ABSTRACT

A system and method for utilizing data stored in an EPG database for modifying advertisement information. In this way, a service provider and/or an advertiser can transmit a single advertisement to all the television stations regardless of their geographic location and other user specific information, and need not re-transmit the advertisement even if there is a change in the show's program description. When the advertisement is displayed, the correct updated information is retrieved from the EPG database and inserted into the advertisement.

In one aspect, the present invention describes a method for modifying an advertisement in an EPG comprising the steps of: storing television schedule information in a first database; storing advertisement information in a second database; incorporating a portion of the television schedule information into a portion of the advertisement information to form a modified advertisement; and displaying the modified advertisement on a screen.

28 Claims, 12 Drawing Sheets

U.S. PATENT DOCUMENTS

| | | | |
|---|---|---|---|
| 3,492,577 A | 1/1970 | Reiter et al. | |
| 3,493,674 A | 2/1970 | Houghton | |
| 3,729,581 A | 4/1973 | Anderson | |
| 3,833,757 A | 9/1974 | Kirk, Jr. et al. | |
| 3,891,792 A | 6/1975 | Kimura | |
| 3,936,868 A | 2/1976 | Thorpe | |
| 3,996,583 A | 12/1976 | Hutt et al. | |
| 4,004,085 A | 1/1977 | Makino et al. | |
| 4,016,361 A | 4/1977 | Pandey | |
| 4,026,555 A | 5/1977 | Kirschner et al. | |
| 4,031,548 A | 6/1977 | Kato et al. | |
| 4,052,719 A | 10/1977 | Hutt et al. | |
| 4,058,830 A | 11/1977 | Guinet et al. | |
| 4,079,419 A | 3/1978 | Siegle et al. | |
| 4,081,753 A | 3/1978 | Miller | |
| 4,081,754 A | 3/1978 | Jackson | |
| 4,096,524 A | 6/1978 | Scott | |
| 4,134,127 A | 1/1979 | Campioni | |
| 4,139,860 A | 2/1979 | Micic et al. | |
| 4,150,254 A | 4/1979 | Schussler et al. | |
| 4,156,850 A | 5/1979 | Beyers, Jr. | |
| 4,161,728 A | 7/1979 | Insam | |
| 4,162,513 A | 7/1979 | Beyers, Jr. et al. | |
| 4,170,782 A | 10/1979 | Miller | |
| 4,186,413 A | 1/1980 | Mortimer | |
| 4,189,781 A | 2/1980 | Douglas | |
| 4,203,130 A | 5/1980 | Doumit et al. | |
| 4,205,343 A | 5/1980 | Barrett | |
| 4,218,698 A | 8/1980 | Bart et al. | |
| 4,228,543 A | 10/1980 | Jackson | |
| 4,231,031 A | 10/1980 | Crowther et al. | |
| 4,233,628 A | 11/1980 | Ciciora | |
| 4,249,211 A | 2/1981 | Baba et al. | |
| 4,249,213 A | 2/1981 | Imaide et al. | |
| 4,261,006 A | 4/1981 | Weintraub et al. | |
| 4,264,924 A | 4/1981 | Freeman | |
| 4,264,925 A | 4/1981 | Freeman et al. | |
| 4,270,145 A | 5/1981 | Farina | |
| 4,271,532 A | 6/1981 | Wine | |
| 4,276,597 A | 6/1981 | Dissly et al. | |
| 4,283,787 A | 8/1981 | Chambers | |
| 4,288,809 A | 9/1981 | Yabe | |
| 4,290,142 A | 9/1981 | Schnee et al. | |
| 4,305,101 A | 12/1981 | Yarbrough et al. | |
| 4,329,684 A | 5/1982 | Monteath et al. | |
| 4,331,974 A | 5/1982 | Cogswell et al. | |
| 4,337,480 A | 6/1982 | Bourassin et al. | |
| 4,337,483 A | 6/1982 | Guillou | |
| 4,344,090 A | 8/1982 | Belisomi et al. | |
| 4,367,559 A | 1/1983 | Tults | |
| 4,375,651 A | 3/1983 | Templin et al. | |
| 4,381,522 A | 4/1983 | Lambert | |
| 4,388,645 A | 6/1983 | Cox et al. | |
| 4,390,901 A | 6/1983 | Keiser | |
| 4,393,376 A | 7/1983 | Thomas | |
| 4,403,285 A | 9/1983 | Kikuchi | |
| 4,405,946 A | 9/1983 | Knight | |
| 4,412,244 A | 10/1983 | Shanley, II | |
| 4,413,281 A | 11/1983 | Thonnart | |
| 4,420,769 A | 12/1983 | Novak | |
| 4,425,579 A | 1/1984 | Merrell | |
| 4,425,581 A | 1/1984 | Schweppe et al. | |
| 4,429,385 A | 1/1984 | Cichelli et al. | |
| 4,439,784 A | 3/1984 | Furukawa et al. | |
| 4,449,249 A | 5/1984 | Price | |
| 4,456,925 A | 6/1984 | Skerlos et al. | |
| 4,466,017 A | 8/1984 | Banker | |
| 4,477,830 A | 10/1984 | Lindman et al. | |
| 4,488,179 A | 12/1984 | Kruger et al. | |
| 4,495,654 A | 1/1985 | Deiss | |
| 4,496,171 A | 1/1985 | Cherry | |
| 4,496,804 A | 1/1985 | Hung | |
| 4,496,976 A | 1/1985 | Swanson et al. | |
| 4,510,623 A | 4/1985 | Bonneau et al. | |
| 4,520,404 A | 5/1985 | Von Kohorn | |
| 4,523,228 A | 6/1985 | Banker | |
| 4,527,194 A | 7/1985 | Sirazi | |
| 4,531,020 A | 7/1985 | Wechselberger et al. | |
| 4,533,910 A | 8/1985 | Sukonick et al. | |
| 4,536,791 A | 8/1985 | Campbell et al. | |
| 4,547,804 A | 10/1985 | Greenberg | |
| 4,554,584 A | 11/1985 | Elam et al. | |
| 4,555,755 A | 11/1985 | Kurosawa et al. | |
| 4,555,775 A | 11/1985 | Pike | |
| 4,566,034 A | 1/1986 | Harger et al. | |
| 4,573,072 A | 2/1986 | Freeman | |
| 4,587,520 A | 5/1986 | Astle | |
| 4,595,951 A | 6/1986 | Filliman | |
| 4,595,952 A | 6/1986 | Filliman | |
| 4,598,288 A | 7/1986 | Yarbrough et al. | |
| 4,602,279 A | 7/1986 | Freeman | |
| 4,605,964 A | 8/1986 | Chard | |
| 4,605,973 A | 8/1986 | Von Kohorn | |
| 4,608,859 A | 9/1986 | Rockley | |
| 4,620,229 A | 10/1986 | Amano et al. | |
| 4,622,545 A | 11/1986 | Atkinson | |
| 4,635,109 A | 1/1987 | Comeau | |
| 4,635,121 A | 1/1987 | Hoffmann | |
| 4,641,205 A | 2/1987 | Beyers, Jr. | |
| 4,677,466 A | 6/1987 | Lert, Jr. et al. | |
| 4,685,131 A | 8/1987 | Horne | |
| 4,689,022 A | 8/1987 | Peers et al. | |
| 4,691,351 A | 9/1987 | Hayashi et al. | |
| 4,694,490 A | 9/1987 | Harvey et al. | |
| 4,701,794 A | 10/1987 | Froling et al. | |
| 4,704,725 A | 11/1987 | Harvey et al. | |
| 4,706,121 A | 11/1987 | Young | |
| 4,712,105 A | 12/1987 | Kohler | |
| 4,714,919 A | 12/1987 | Foster | |
| 4,718,107 A | 1/1988 | Hayes | |
| RE32,632 E | 3/1988 | Atkinson | |
| 4,729,027 A | 3/1988 | Hakamada et al. | |
| 4,734,769 A | 3/1988 | Davis | |
| 4,745,549 A | 5/1988 | Hashimoto | |
| 4,746,983 A | 5/1988 | Hakamada | |
| 4,748,618 A | 5/1988 | Brown et al. | |
| 4,750,036 A | 6/1988 | Martinez | |
| 4,750,213 A | 6/1988 | Novak | |
| 4,751,578 A | 6/1988 | Reiter et al. | |
| 4,754,326 A | 6/1988 | Kram et al. | |
| 4,768,228 A | 8/1988 | Clupper et al. | |
| 4,772,882 A | 9/1988 | Mical | |
| 4,775,935 A | 10/1988 | Yourick | |
| 4,785,408 A | 11/1988 | Britton et al. | |
| 4,787,063 A | 11/1988 | Muguet | |
| 4,812,834 A | 3/1989 | Wells | |
| 4,814,883 A | 3/1989 | Perine et al. | |
| 4,821,102 A | 4/1989 | Ichikawa et al. | |
| 4,821,211 A | 4/1989 | Torres | |
| 4,829,558 A | 5/1989 | Welsh | |
| 4,847,604 A | 7/1989 | Doyle | |
| 4,847,700 A | 7/1989 | Freeman | |
| 4,855,813 A | 8/1989 | Russell et al. | |
| 4,857,999 A | 8/1989 | Welsh | |
| 4,862,268 A | 8/1989 | Campbell et al. | |
| 4,864,429 A | 9/1989 | Eigeldinger et al. | |
| 4,873,584 A | 10/1989 | Hashimoto | |
| 4,873,623 A | 10/1989 | Lane et al. | |
| 4,882,732 A | 11/1989 | Kaminaga | |
| 4,884,223 A | 11/1989 | Ingle et al. | |
| 4,888,796 A | 12/1989 | Olivo, Jr. | |
| 4,890,168 A | 12/1989 | Inoue et al. | |
| 4,890,320 A | 12/1989 | Monslow et al. | |
| 4,890,321 A | 12/1989 | Seth-Smith et al. | |
| 4,894,789 A | 1/1990 | Yee | |
| 4,899,136 A | 2/1990 | Beard et al. | |
| 4,899,139 A | 2/1990 | Ishimochi et al. | |
| 4,905,094 A | 2/1990 | Pocock et al. | |
| 4,908,707 A | 3/1990 | Kinghorn | |
| 4,908,713 A | 3/1990 | Levine | |
| 4,908,859 A | 3/1990 | Bennett et al. | |
| 4,914,517 A | 4/1990 | Duffield | |
| 4,914,732 A | 4/1990 | Henderson et al. | |
| 4,918,531 A | 4/1990 | Johnson | |
| 4,930,158 A | 5/1990 | Vogel | |
| 4,930,160 A | 5/1990 | Vogel | |
| 4,931,783 A | 6/1990 | Atkinson | |

| | | | | | | |
|---|---|---|---|---|---|---|
| 4,935,865 | A | 6/1990 | Rowe et al. | 5,237,411 | A | 8/1993 | Fink et al. |
| 4,937,821 | A | 6/1990 | Boulton | 5,237,417 | A | 8/1993 | Hayashi et al. |
| 4,937,863 | A | 6/1990 | Robert et al. | 5,237,418 | A | 8/1993 | Kaneko |
| 4,939,507 | A | 7/1990 | Beard et al. | 5,239,540 | A | 8/1993 | Rovira et al. |
| 4,942,391 | A | 7/1990 | Kikuta | 5,245,420 | A | 9/1993 | Harney et al. |
| 4,954,882 | A | 9/1990 | Kamemoto | 5,247,347 | A | 9/1993 | Litteral et al. |
| 4,959,720 | A | 9/1990 | Duffield et al. | 5,247,364 | A | 9/1993 | Banker et al. |
| 4,963,994 | A | 10/1990 | Levine | 5,247,580 | A | 9/1993 | Kimura et al. |
| 4,977,455 | A | 12/1990 | Young | 5,253,066 | A | 10/1993 | Vogel |
| 4,987,486 | A | 1/1991 | Johnson et al. | 5,253,067 | A | 10/1993 | Chaney et al. |
| 4,991,011 | A | 2/1991 | Johnson et al. | 5,260,778 | A | 11/1993 | Kauffman et al. |
| 4,991,012 | A | 2/1991 | Yoshino | 5,260,788 | A | 11/1993 | Takano et al. |
| 4,992,782 | A | 2/1991 | Sakamoto et al. | 5,260,999 | A | 11/1993 | Wyman |
| 4,992,940 | A | 2/1991 | Dworkin | 5,283,561 | A | 2/1994 | Lumelsky et al. |
| 4,995,078 | A | 2/1991 | Monslow et al. | 5,283,639 | A | 2/1994 | Esch et al. |
| 4,996,642 | A | 2/1991 | Hey | 5,283,819 | A | 2/1994 | Glick et al. |
| 4,998,171 | A | 3/1991 | Kim et al. | 5,285,265 | A | 2/1994 | Choi et al. |
| 5,003,384 | A | 3/1991 | Durden et al. | 5,285,278 | A | 2/1994 | Holman |
| 5,008,853 | A | 4/1991 | Bly et al. | 5,299,006 | A | 3/1994 | Kim et al. |
| 5,014,125 | A | 5/1991 | Pocock et al. | 5,301,028 | A | 4/1994 | Banker et al. |
| 5,023,721 | A | 6/1991 | Moon-Hwan | 5,307,173 | A | 4/1994 | Yuen et al. |
| 5,027,400 | A | 6/1991 | Baji et al. | 5,311,423 | A | 5/1994 | Clark |
| 5,031,045 | A | 7/1991 | Kawasaki | 5,313,282 | A | 5/1994 | Hayashi |
| 5,036,314 | A | 7/1991 | Barillari et al. | 5,315,392 | A | 5/1994 | Ishikawa et al. |
| 5,038,211 | A | 8/1991 | Hallenbeck | 5,317,403 | A | 5/1994 | Keenan |
| 5,040,067 | A | 8/1991 | Yamazaki | 5,319,445 | A | 6/1994 | Fitts |
| 5,045,947 | A | 9/1991 | Beery | 5,323,234 | A | 6/1994 | Kawasaki |
| 5,047,867 | A | 9/1991 | Strubbe et al. | 5,323,240 | A | 6/1994 | Amano et al. |
| 5,058,160 | A | 10/1991 | Banker et al. | 5,325,183 | A | 6/1994 | Rhee |
| 5,062,060 | A | 10/1991 | Kolnick | 5,325,423 | A | 6/1994 | Lewis |
| 5,068,734 | A | 11/1991 | Beery | 5,335,277 | A | 8/1994 | Harvey et al. |
| 5,072,412 | A | 12/1991 | Henderson, Jr. et al. | 5,343,239 | A | 8/1994 | Lappington et al. |
| 5,075,771 | A | 12/1991 | Hashimoto | 5,347,167 | A | 9/1994 | Singh |
| 5,083,205 | A | 1/1992 | Arai | 5,347,632 | A | 9/1994 | Filepp et al. |
| 5,083,800 | A | 1/1992 | Lockton | 5,351,075 | A | 9/1994 | Herz et al. |
| 5,091,785 | A | 2/1992 | Canfield et al. | 5,353,121 | A | 10/1994 | Young et al. |
| 5,093,921 | A | 3/1992 | Bevins, Jr. | 5,357,276 | A | 10/1994 | Banker et al. |
| 5,099,319 | A | 3/1992 | Esch et al. | 5,359,367 | A | 10/1994 | Stockill |
| 5,103,314 | A | 4/1992 | Keenan | 5,359,601 | A | 10/1994 | Wasilewski et al. |
| 5,105,184 | A | 4/1992 | Pirani et al. | 5,365,282 | A | 11/1994 | Levine |
| 5,109,279 | A | 4/1992 | Ando | 5,367,316 | A | 11/1994 | Ikezaki |
| 5,119,188 | A | 6/1992 | McCalley et al. | 5,367,330 | A | 11/1994 | Haave et al. |
| 5,121,476 | A | 6/1992 | Yee | 5,373,288 | A | 12/1994 | Blahut |
| 5,123,046 | A | 6/1992 | Levine | 5,374,942 | A | 12/1994 | Gilligan et al. |
| 5,126,851 | A | 6/1992 | Yoshimura | 5,374,951 | A | 12/1994 | Welsh |
| 5,128,766 | A | 7/1992 | Choi | 5,377,317 | A | 12/1994 | Bates et al. |
| 5,146,335 | A | 9/1992 | Kim et al. | 5,377,319 | A | 12/1994 | Kitahara et al. |
| 5,148,154 | A | 9/1992 | Mackay et al. | 5,382,983 | A | 1/1995 | Kwoh et al. |
| 5,148,275 | A | 9/1992 | Blatter et al. | 5,384,910 | A | 1/1995 | Torres |
| 5,151,782 | A | 9/1992 | Ferraro | 5,387,945 | A | 2/1995 | Takeuchi |
| 5,151,789 | A | 9/1992 | Young | 5,389,964 | A | 2/1995 | Oberle et al. |
| 5,155,591 | A | 10/1992 | Wachob | 5,390,027 | A | 2/1995 | Henmi et al. |
| 5,155,806 | A | 10/1992 | Hoeber et al. | 5,398,074 | A | 3/1995 | Duffield et al. |
| 5,157,768 | A | 10/1992 | Hoeber et al. | 5,404,393 | A | 4/1995 | Remillard |
| 5,161,019 | A | 11/1992 | Emanuel | 5,410,326 | A | 4/1995 | Goldstein |
| 5,161,023 | A | 11/1992 | Keenan | 5,410,343 | A | 4/1995 | Coddington et al. |
| 5,162,905 | A | 11/1992 | Itoh et al. | 5,410,344 | A | 4/1995 | Graves et al. |
| 5,170,388 | A | 12/1992 | Endoh | 5,410,367 | A | 4/1995 | Zahavi et al. |
| 5,172,111 | A | 12/1992 | Olivo, Jr. | 5,412,720 | A | 5/1995 | Hoarty |
| 5,172,413 | A | 12/1992 | Bradley et al. | 5,416,508 | A | 5/1995 | Sakuma et al. |
| 5,177,604 | A | 1/1993 | Martinez | 5,424,770 | A | 6/1995 | Schmelzer et al. |
| 5,179,654 | A | 1/1993 | Richards et al. | 5,425,101 | A | 6/1995 | Woo et al. |
| 5,195,092 | A | 3/1993 | Wilson et al. | 5,432,561 | A | 7/1995 | Strubbe |
| 5,200,823 | A | 4/1993 | Yoneda et al. | 5,434,625 | A | 7/1995 | Willis |
| 5,204,897 | A | 4/1993 | Wyman | 5,434,626 | A | 7/1995 | Hayashi et al. |
| 5,206,722 | A | 4/1993 | Kwan | 5,436,676 | A | 7/1995 | Pint et al. |
| 5,210,611 | A | 5/1993 | Yee et al. | 5,438,372 | A | 8/1995 | Tsumori et al. |
| 5,212,553 | A | 5/1993 | Maruoka | 5,440,678 | A | 8/1995 | Eisen et al. |
| 5,214,622 | A | 5/1993 | Nemoto et al. | 5,444,499 | A | 8/1995 | Saitoh |
| 5,216,515 | A | 6/1993 | Steele et al. | 5,446,919 | A | 8/1995 | Wilkins |
| 5,220,420 | A | 6/1993 | Hoarty et al. | 5,452,012 | A | 9/1995 | Saitoh |
| 5,223,924 | A | 6/1993 | Strubbe | 5,453,146 | A | 9/1995 | Kemper |
| 5,227,874 | A | 7/1993 | Von Kohorn | 5,453,796 | A | 9/1995 | Duffield et al. |
| 5,231,493 | A | 7/1993 | Apitz | 5,459,522 | A | 10/1995 | Pint |
| RE34,340 | E | 8/1993 | Freeman | 5,461,415 | A | 10/1995 | Wolf et al. |
| 5,233,423 | A | 8/1993 | Jernigan et al. | 5,465,113 | A | 11/1995 | Gilboy |
| 5,233,654 | A | 8/1993 | Harvey et al. | 5,465,385 | A | 11/1995 | Ohga et al. |
| 5,235,415 | A | 8/1993 | Bonicel et al. | 5,469,206 | A | 11/1995 | Strubbe et al. |
| 5,236,199 | A | 8/1993 | Thompson, Jr. | 5,477,262 | A | 12/1995 | Banker et al. |

| | | |
|---|---|---|
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,523,794 A | 6/1996 | Mankovitz et al. |
| 5,523,796 A | 6/1996 | Marshall et al. |
| 5,524,195 A | 6/1996 | Clanton, III et al. |
| 5,525,795 A | 6/1996 | MacGregor et al. |
| 5,526,034 A | 6/1996 | Hoarty et al. |
| 5,527,257 A | 6/1996 | Piramoon |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim et al. |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,584,025 A | 12/1996 | Keithley et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,606,374 A | 2/1997 | Bertram |
| 5,608,448 A | 3/1997 | Smoral et al. |
| 5,610,653 A | 3/1997 | Abecassis |
| 5,610,664 A | 3/1997 | Bobert |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers, II et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,549 A | 4/1998 | Reilly et al. |
| 5,749,043 A | 5/1998 | Worthy |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |

| | | | | | | |
|---|---|---|---|---|---|---|
| 5,781,245 A | 7/1998 | Van Der Weij et al. | | 5,940,572 A | 8/1999 | Balaban et al. |
| 5,781,246 A | 7/1998 | Alten et al. | | 5,945,988 A | 8/1999 | Williams et al. |
| 5,784,258 A | 7/1998 | Quinn | | 5,951,642 A | 9/1999 | Onoe et al. |
| 5,790,202 A | 8/1998 | Kummer et al. | | 5,953,005 A | 9/1999 | Liu |
| 5,790,426 A | 8/1998 | Robinson | | 5,959,688 A | 9/1999 | Schein et al. |
| 5,790,835 A | 8/1998 | Case et al. | | 5,960,411 A | 9/1999 | Hartman et al. |
| 5,790,935 A | 8/1998 | Payton | | 5,973,683 A | 10/1999 | Cragun et al. |
| 5,793,364 A | 8/1998 | Bolanos et al. | | 5,974,222 A | 10/1999 | Yuen et al. |
| 5,793,409 A | 8/1998 | Tetsumura | | 5,977,964 A | 11/1999 | Williams et al. |
| 5,793,438 A | 8/1998 | Bedard | | 5,986,650 A | 11/1999 | Ellis et al. |
| 5,793,964 A | 8/1998 | Rogers et al. | | 5,988,078 A | 11/1999 | Levine |
| 5,798,785 A | 8/1998 | Hendricks et al. | | 5,990,890 A | 11/1999 | Etheredge |
| 5,801,747 A | 9/1998 | Bedard | | 5,990,927 A | 11/1999 | Hendricks et al. |
| 5,801,785 A | 9/1998 | Crump et al. | | 5,999,912 A | 12/1999 | Wodarz et al. |
| 5,801,787 A | 9/1998 | Schein et al. | | 6,002,393 A | 12/1999 | Hite et al. |
| 5,802,284 A | 9/1998 | Karlton et al. | | 6,002,394 A | 12/1999 | Schein et al. |
| 5,805,154 A | 9/1998 | Brown | | 6,002,444 A | 12/1999 | Marshall et al. |
| 5,805,167 A | 9/1998 | van Cruyningen | | 6,005,562 A | 12/1999 | Shiga et al. |
| 5,805,235 A | 9/1998 | Bedard | | 6,005,565 A | 12/1999 | Legall et al. |
| 5,805,763 A | 9/1998 | Lawler et al. | | 6,005,597 A | 12/1999 | Barrett et al. |
| 5,805,804 A | 9/1998 | Laursen et al. | | 6,006,257 A | 12/1999 | Slezak |
| 5,808,608 A | 9/1998 | Young et al. | | 6,008,802 A | 12/1999 | Iki et al. |
| 5,808,694 A | 9/1998 | Usui et al. | | 6,008,803 A | 12/1999 | Rowe et al. |
| 5,809,204 A | 9/1998 | Young et al. | | 6,011,546 A | 1/2000 | Bertram |
| 5,812,205 A | 9/1998 | Milnes et al. | | 6,014,137 A | 1/2000 | Burns |
| 5,815,145 A | 9/1998 | Matthews, III | | 6,014,502 A | 1/2000 | Moraes |
| 5,815,671 A | 9/1998 | Morrison | | 6,016,141 A | 1/2000 | Knudson et al. |
| 5,818,438 A | 10/1998 | Howe et al. | | 6,018,372 A | 1/2000 | Etheredge |
| 5,818,439 A | 10/1998 | Nagasaka et al. | | 6,018,768 A | 1/2000 | Ullman et al. |
| 5,818,441 A | 10/1998 | Throckmorton et al. | | 6,020,883 A | 2/2000 | Herz et al. |
| 5,818,541 A | 10/1998 | Matsuura et al. | | 6,020,929 A | 2/2000 | Marshall et al. |
| 5,819,019 A | 10/1998 | Nelson | | 6,025,837 A | 2/2000 | Matthews, III et al. |
| 5,819,156 A | 10/1998 | Belmont | | 6,025,886 A | 2/2000 | Koda |
| 5,819,284 A | 10/1998 | Farber et al. | | 6,028,599 A | 2/2000 | Yuen et al. |
| 5,822,123 A | 10/1998 | Davis et al. | | 6,028,600 A | 2/2000 | Rosin et al. |
| 5,828,402 A | 10/1998 | Collings | | 6,029,045 A | 2/2000 | Picco et al. |
| 5,828,419 A | 10/1998 | Bruette et al. | | 6,029,176 A | 2/2000 | Cannon |
| 5,828,420 A | 10/1998 | Marshall et al. | | 6,029,195 A | 2/2000 | Herz |
| 5,828,839 A | 10/1998 | Moncreiff | | 6,035,304 A | 3/2000 | Machida et al. |
| 5,828,945 A | 10/1998 | Klosterman | | 6,047,317 A | 4/2000 | Bisdikian et al. |
| 5,830,068 A | 11/1998 | Brenner et al. | | 6,049,824 A | 4/2000 | Simonin |
| 5,838,314 A | 11/1998 | Neel et al. | | 6,052,145 A | 4/2000 | Macrae et al. |
| 5,842,010 A | 11/1998 | Jain et al. | | 6,061,060 A | 5/2000 | Berry et al. |
| 5,842,199 A | 11/1998 | Miller et al. | | 6,061,082 A | 5/2000 | Park |
| 5,844,620 A * | 12/1998 | Coleman et al. ............... 725/54 | | 6,061,097 A | 5/2000 | Satterfield |
| 5,848,352 A | 12/1998 | Dougherty et al. | | 6,064,376 A | 5/2000 | Berezowski et al. |
| 5,848,396 A | 12/1998 | Gerace | | 6,064,980 A | 5/2000 | Jacobi et al. |
| 5,848,397 A | 12/1998 | Marsh et al. | | 6,067,303 A | 5/2000 | Aaker et al. |
| 5,850,218 A | 12/1998 | LaJoie et al. | | 6,072,460 A | 6/2000 | Marshall et al. |
| 5,862,292 A | 1/1999 | Kubota et al. | | 6,075,526 A | 6/2000 | Rothmuller |
| 5,867,226 A | 2/1999 | Wehmeyer | | 6,075,551 A | 6/2000 | Berezowski et al. |
| 5,867,227 A | 2/1999 | Yamaguchi | | 6,075,575 A | 6/2000 | Schein et al. |
| 5,870,543 A | 2/1999 | Ronning | | 6,078,348 A | 6/2000 | Klosterman et al. |
| 5,872,588 A | 2/1999 | Aras et al. | | 6,081,750 A | 6/2000 | Hoffberg et al. |
| 5,874,985 A | 2/1999 | Matthews, III | | 6,081,830 A | 6/2000 | Schindler |
| 5,875,108 A | 2/1999 | Hoffberg et al. | | 6,088,722 A | 7/2000 | Herz et al. |
| 5,880,768 A | 3/1999 | Lemmons et al. | | 6,091,883 A | 7/2000 | Artigalas et al. |
| 5,883,677 A | 3/1999 | Hofmann | | 6,098,065 A | 8/2000 | Skillen et al. |
| 5,886,691 A | 3/1999 | Furuya et al. | | 6,108,042 A | 8/2000 | Adams et al. |
| 5,886,731 A | 3/1999 | Ebisawa | | 6,111,614 A | 8/2000 | Mugura et al. |
| 5,889,950 A | 3/1999 | Kuzma | | 6,112,186 A | 8/2000 | Bergh et al. |
| 5,892,498 A | 4/1999 | Marshall et al. | | 6,115,057 A | 9/2000 | Kwoh et al. |
| 5,892,535 A | 4/1999 | Allen et al. | | 6,118,492 A | 9/2000 | Milnes et al. |
| 5,900,905 A | 5/1999 | Shoff et al. | | 6,119,098 A | 9/2000 | Guyot et al. |
| 5,903,314 A | 5/1999 | Niijima et al. | | 6,119,101 A | 9/2000 | Peckover |
| 5,903,545 A | 5/1999 | Sabourin et al. | | 6,122,011 A | 9/2000 | Dias et al. |
| 5,903,816 A | 5/1999 | Broadwin et al. | | 6,125,230 A | 9/2000 | Yaginuma |
| 5,905,497 A | 5/1999 | Vaughan et al. | | 6,133,909 A | 10/2000 | Schein et al. |
| 5,907,323 A | 5/1999 | Lawler et al. | | 6,141,003 A | 10/2000 | Chor et al. |
| 5,907,366 A | 5/1999 | Farmer et al. | | 6,147,714 A | 11/2000 | Terasawa et al. |
| 5,914,746 A | 6/1999 | Matthews, III et al. | | 6,147,715 A | 11/2000 | Yuen et al. |
| 5,917,481 A | 6/1999 | Rzeszewski et al. | | 6,151,059 A | 11/2000 | Schein et al. |
| 5,917,830 A | 6/1999 | Chen et al. | | 6,154,203 A | 11/2000 | Yuen et al. |
| 5,918,014 A | 6/1999 | Robinson | | 6,157,413 A | 12/2000 | Hanafee et al. |
| 5,920,700 A | 7/1999 | Gordon et al. | | 6,160,545 A | 12/2000 | Eyer et al. |
| 5,929,849 A | 7/1999 | Kikinis | | 6,160,546 A | 12/2000 | Thompson et al. |
| 5,929,850 A | 7/1999 | Broadwin et al. | | 6,160,570 A | 12/2000 | Sitnik |
| 5,936,679 A | 8/1999 | Kasahara et al. | | 6,163,316 A | 12/2000 | Killian |
| 5,940,073 A | 8/1999 | Klosterman et al. | | 6,169,542 B1 | 1/2001 | Hooks et al. |

| Patent No. | Date | Name |
|---|---|---|
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,201,536 B1 | 3/2001 | Hendricks et al. |
| 6,202,212 B1 | 3/2001 | Sturgeon et al. |
| 6,209,129 B1 | 3/2001 | Carr et al. |
| 6,209,130 B1 | 3/2001 | Rector, Jr. et al. |
| 6,216,264 B1 | 4/2001 | Maze et al. |
| 6,237,145 B1 | 5/2001 | Narasimhan et al. |
| 6,237,146 B1 | 5/2001 | Richards et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,282,713 B1 | 8/2001 | Kitsukawa et al. |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang et al. |
| 6,312,336 B1 | 11/2001 | Handelman et al. |
| 6,320,588 B1 | 11/2001 | Palmer et al. |
| 6,323,911 B1 | 11/2001 | Schein et al. |
| 6,323,931 B1 | 11/2001 | Fujita et al. |
| 6,331,877 B1 | 12/2001 | Bennington et al. |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |
| 6,363,525 B1 | 3/2002 | Dougherty et al. |
| 6,366,890 B1 | 4/2002 | Usrey |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,493,876 B1 | 12/2002 | DeFreese et al. |
| 6,498,895 B2 | 12/2002 | Young et al. |
| 6,505,348 B1 | 1/2003 | Knowles et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,637,029 B1 | 10/2003 | Maissel et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,704,931 B1 | 3/2004 | Schaffer et al. |
| 6,718,551 B1 | 4/2004 | Swix et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,847,387 B2 | 1/2005 | Roth |
| 6,857,131 B1 | 2/2005 | Yagawa et al. |
| 6,868,551 B1 | 3/2005 | Lawler et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,039,935 B2 | 5/2006 | Knudson et al. |
| 7,047,550 B1 | 5/2006 | Yasukawa et al. |
| 7,069,576 B1 | 6/2006 | Knudson et al. |
| 7,100,185 B2 | 8/2006 | Bennington et al. |
| 7,117,518 B1 | 10/2006 | Takahashi et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,480,929 B2 | 1/2009 | Klosterman et al. |
| 7,487,528 B2 | 2/2009 | Satterfield et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,634,786 B2 | 12/2009 | Knee et al. |
| 7,665,109 B2 | 2/2010 | Matthews, III et al. |
| 7,779,437 B2 | 8/2010 | Barton |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0059602 A1 | 5/2002 | Macrae et al. |
| 2002/0073424 A1 | 6/2002 | Ward, III et al. |
| 2002/0083439 A1 | 6/2002 | Eldering |
| 2002/0092017 A1 | 7/2002 | Klosterman et al. |
| 2002/0120933 A1 | 8/2002 | Knudson et al. |
| 2002/0124249 A1 | 9/2002 | Shintani et al. |
| 2003/0005432 A1 | 1/2003 | Ellis et al. |
| 2003/0005445 A1* | 1/2003 | Schein et al. .................. 725/51 |
| 2003/0110499 A1 | 6/2003 | Knudson et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |

| | | | | | | |
|---|---|---|---|---|---|---|
| 2004/0003407 | A1 | 1/2004 | Hanafee et al. | EP | 0 444 496 | 9/1991 |
| 2004/0049787 | A1 | 3/2004 | Maissel et al. | EP | 0 447 968 | 9/1991 |
| 2004/0078809 | A1 | 4/2004 | Drazin | EP | 0 488 379 | 6/1992 |
| 2004/0111742 | A1* | 6/2004 | Hendricks et al. ............. 725/34 | EP | 0 497 235 | 8/1992 |
| 2004/0139465 | A1 | 7/2004 | Matthews, III et al. | EP | 0 532 322 | 3/1993 |
| 2004/0168189 | A1 | 8/2004 | Reynolds et al. | EP | 0 550 911 | 7/1993 |
| 2004/0194131 | A1 | 9/2004 | Ellis et al. | EP | 0 560 593 | 9/1993 |
| 2004/0194138 | A1 | 9/2004 | Boylan, III et al. | EP | 0 572 090 | 12/1993 |
| 2005/0010949 | A1 | 1/2005 | Ward et al. | EP | 0 620 689 | 10/1994 |
| 2005/0015804 | A1 | 1/2005 | LaJoie et al. | EP | 0 624 039 | 11/1994 |
| 2005/0097622 | A1 | 5/2005 | Zigmond et al. | EP | 0 673 164 | 9/1995 |
| 2005/0155056 | A1 | 7/2005 | Knee et al. | EP | 0682452 | 11/1995 |
| 2005/0157217 | A1 | 7/2005 | Hendricks | EP | 0 721 253 | 7/1996 |
| 2005/0198668 | A1 | 9/2005 | Yuen et al. | EP | 0 725 539 | 8/1996 |
| 2005/0204382 | A1 | 9/2005 | Ellis | EP | 0 752 767 | 1/1997 |
| 2005/0216936 | A1 | 9/2005 | Knudson et al. | EP | 0 753 964 | 1/1997 |
| 2005/0229214 | A1 | 10/2005 | Young et al. | EP | 0 762 751 | 3/1997 |
| 2005/0244138 | A1 | 11/2005 | O'Connor et al. | EP | 0 772 360 | 5/1997 |
| 2005/0278741 | A1 | 12/2005 | Robarts | EP | 0 774 866 A2 | 5/1997 |
| 2005/0283796 | A1 | 12/2005 | Flickinger | EP | 0 775 417 | 5/1997 |
| 2006/0248555 | A1 | 11/2006 | Eldering | EP | 0 784 405 | 7/1997 |
| 2007/0016926 | A1 | 1/2007 | Ward et al. | EP | 0 804 028 | 10/1997 |
| 2007/0033613 | A1 | 2/2007 | Ward et al. | EP | 0 805 594 | 11/1997 |
| 2007/0162934 | A1 | 7/2007 | Roop et al. | EP | 0 806 111 | 11/1997 |
| 2007/0186240 | A1 | 8/2007 | Ward et al. | EP | 0 822 718 | 2/1998 |
| 2007/0234393 | A1 | 10/2007 | Walker et al. | EP | 0 827 340 | 3/1998 |
| 2008/0127265 | A1 | 5/2008 | Ward et al. | EP | 0 834 798 | 4/1998 |
| 2008/0127266 | A1 | 5/2008 | Ward et al. | EP | 0 848 554 | 6/1998 |
| 2008/0178221 | A1 | 7/2008 | Schein et al. | EP | 0 849 948 | 6/1998 |
| 2008/0184315 | A1* | 7/2008 | Ellis et al. ....................... 725/60 | EP | 0 851 681 | 7/1998 |
| 2008/0189744 | A1 | 8/2008 | Schein et al. | EP | 0 852 442 | 7/1998 |
| 2008/0235725 | A1 | 9/2008 | Hendricks | EP | 0 854 645 A2 | 7/1998 |
| 2011/0035771 | A1 | 2/2011 | Ward, III et al. | EP | 0 854 654 | 7/1998 |
| | | | | EP | 0 880 856 | 12/1998 |
| FOREIGN PATENT DOCUMENTS | | | | EP | 0 905 985 | 3/1999 |
| AU | | 731010 | 7/1998 | EP | 0 924 927 | 6/1999 |
| AU | | 733993 | 2/1999 | EP | 0 935 393 | 8/1999 |
| AU | | 760568 | 5/2003 | EP | 0 944 253 | 9/1999 |
| AU | | 765648 | 9/2003 | EP | 0 963 119 | 12/1999 |
| CA | | 1030505 | 5/1978 | EP | 0 988 876 | 3/2000 |
| CA | | 1187197 | 5/1985 | EP | 1 058 999 | 12/2000 |
| CA | | 1188811 | 6/1985 | EP | 1 067 792 | 1/2001 |
| CA | | 1196082 | 10/1985 | EP | 1 093 305 | 4/2001 |
| CA | | 1200911 | 2/1986 | EP | 1 095 504 | 5/2001 |
| CA | | 2151458 | 6/1994 | EP | 1 036 466 | 3/2003 |
| CA | | 2164608 | 12/1994 | FR | 2662895 | 12/1991 |
| CA | | 2285645 | 7/1998 | GB | 1 554 411 | 10/1979 |
| CA | | 2297039 | 1/1999 | GB | 2034995 | 6/1980 |
| CA | | 2312326 | 6/1999 | GB | 2126002 | 3/1984 |
| CA | | 2322217 | 9/1999 | GB | 2185670 | 7/1987 |
| CA | | 2324278 | 11/1999 | GB | 2217144 | 10/1989 |
| CA | | 2513282 | 11/1999 | GB | 2256546 | 12/1992 |
| CN | | 1226030 | 8/1999 | GB | 2264409 | 8/1993 |
| CN | | 1555191 | 12/2004 | GB | 2305049 | 3/1997 |
| DE | | 2918846 | 11/1980 | GB | 2309134 | 7/1997 |
| DE | | 3246225 | 6/1984 | HK | 1035285 | 3/2005 |
| DE | | 3337204 | 4/1985 | JP | 58-137334 | 8/1983 |
| DE | | 3621263 | 1/1988 | JP | 58-137344 | 8/1983 |
| DE | | 37 02 220 | 8/1988 | JP | 58-196738 | 11/1983 |
| DE | | 3909334 | 9/1990 | JP | 58-210776 | 12/1983 |
| DE | | 41 43 074 | 7/1992 | JP | 59-141878 | 8/1984 |
| DE | | 42 01 031 | 7/1993 | JP | 60-61935 | 4/1985 |
| DE | | 4 440 419 | 5/1996 | JP | 61-050470 | 3/1986 |
| DE | | 19531121 | 2/1997 | JP | 61-074476 | 4/1986 |
| DE | | 19740079 | 3/1999 | JP | 62-060370 | 3/1987 |
| DE | | 19931046 | 1/2001 | JP | 62-060384 | 3/1987 |
| DE | | 42 90 947 | 11/2006 | JP | 63-234679 | 9/1988 |
| EP | | 0 222 025 | 5/1987 | JP | 1-307944 | 12/1989 |
| EP | | 0 229 526 | 7/1987 | JP | 2-048879 | 2/1990 |
| EP | | 0 239 884 | 10/1987 | JP | 03063990 | 3/1991 |
| EP | | 0 337 336 | 10/1989 | JP | 04-227380 | 8/1992 |
| EP | | 0 339 675 | 11/1989 | JP | 4-335395 | 11/1992 |
| EP | | 0 363 847 | 4/1990 | JP | 05-122692 | 5/1993 |
| EP | | 0 393 555 | 10/1990 | JP | 05-183826 | 7/1993 |
| EP | | 0 396 062 | 11/1990 | JP | 05-284437 | 10/1993 |
| EP | | 0 401 930 | 12/1990 | JP | 06-021907 | 1/1994 |
| EP | | 0 408 892 | 1/1991 | JP | 6-295312 | 10/1994 |
| EP | | 0 420 123 | 4/1991 | JP | 07-020254 | 1/1995 |
| EP | | 0 424 648 | 5/1991 | JP | 7-23356 | 1/1995 |

| | | | | | | |
|---|---|---|---|---|---|---|
| JP | 07-050259 | 2/1995 | | WO | WO 96/07270 | 3/1996 |
| JP | 07-076592 | 3/1995 | | WO | WO 96/08109 | 3/1996 |
| JP | 07-123326 | 5/1995 | | WO | WO 96/08113 | 3/1996 |
| JP | 07-147657 | 6/1995 | | WO | WO 96/08923 | 3/1996 |
| JP | 7-262200 | 10/1995 | | WO | WO 96/09721 | 3/1996 |
| JP | 7-284033 | 10/1995 | | WO | WO 96/13932 | 5/1996 |
| JP | 07-288759 | 10/1995 | | WO | WO 96/13935 | 5/1996 |
| JP | 07-321748 | 12/1995 | | WO | WO 96/17467 | 6/1996 |
| JP | 08-32528 | 2/1996 | | WO | WO 96/17473 | 6/1996 |
| JP | 08-32538 | 2/1996 | | WO | WO 96/21990 | 7/1996 |
| JP | 08-125497 | 5/1996 | | WO | WO 96/26605 | 8/1996 |
| JP | 08-251122 | 9/1996 | | WO | WO 96/27270 | 9/1996 |
| JP | 08-275077 | 10/1996 | | WO | WO 96/27982 | 9/1996 |
| JP | 8-331546 | 12/1996 | | WO | WO 96/31980 | 10/1996 |
| JP | 09-037151 | 2/1997 | | WO | WO 96/34467 | 10/1996 |
| JP | 9-37168 | 2/1997 | | WO | WO 96/34486 | 10/1996 |
| JP | 09-037172 | 2/1997 | | WO | WO 96/34491 | 10/1996 |
| JP | 9065321 | 3/1997 | | WO | WO 96/38799 | 12/1996 |
| JP | 09-102827 | 4/1997 | | WO | WO 96/41471 | 12/1996 |
| JP | 9-244475 | 9/1997 | | WO | WO 96/41477 | 12/1996 |
| JP | 9-261609 | 10/1997 | | WO | WO 96/41478 | 12/1996 |
| JP | 09-247565 | 1/1998 | | WO | WO 97/02702 | 1/1997 |
| JP | 10-501936 | 2/1998 | | WO | WO 97/04595 | 2/1997 |
| JP | 10-143340 | 5/1998 | | WO | WO 97/07656 | 3/1997 |
| JP | 10-143349 | 5/1998 | | WO | WO 97/12486 | 4/1997 |
| JP | 10-512420 | 11/1998 | | WO | WO 97/13368 | 4/1997 |
| JP | 2838892 | 12/1998 | | WO | WO 97/17774 | 5/1997 |
| JP | 2001-213595 | 8/2001 | | WO | WO 97/18675 | 5/1997 |
| JP | 2001-1513595 | 9/2001 | | WO | WO 97/19555 | 5/1997 |
| JP | 2002-279969 | 9/2002 | | WO | WO 97/26612 | 7/1997 |
| JP | 4062577 | 3/2008 | | WO | WO 97/29458 | 8/1997 |
| JP | 4-340258 | 10/2009 | | WO | WO 97/31480 | 8/1997 |
| JP | 4-510282 | 7/2010 | | WO | WO 97/34414 | 9/1997 |
| WO | WO 86/01359 | 2/1986 | | WO | WO 97/41673 | 11/1997 |
| WO | WO 86/01962 | 3/1986 | | WO | WO 97/42763 | 11/1997 |
| WO | WO 87/03766 | 6/1987 | | WO | WO 97/48230 | 12/1997 |
| WO | WO 88/04057 | 6/1988 | | WO | WO 97/49237 | 12/1997 |
| WO | WO 88/04507 | 6/1988 | | WO | WO 97/49241 | 12/1997 |
| WO | WO 89/02682 | 3/1989 | | WO | WO 97/49242 | 12/1997 |
| WO | WO 89/03085 | 4/1989 | | WO | WO 98/00975 | 1/1998 |
| WO | WO 89/12370 | 12/1989 | | WO | WO 98/00976 | 1/1998 |
| WO | WO 90/01243 | 2/1990 | | WO | WO 98/06219 | 2/1998 |
| WO | WO 90/15507 | 12/1990 | | WO | WO 98/10589 | 3/1998 |
| WO | WO 91/00670 | 1/1991 | | WO | WO 98/16062 | 4/1998 |
| WO | WO 91/18476 | 11/1991 | | WO | WO 98/17064 | 4/1998 |
| WO | WO 92/04801 | 3/1992 | | WO | WO 98/20675 | 5/1998 |
| WO | WO 93/04473 | 3/1993 | | WO | WO 98/26569 | 6/1998 |
| WO | WO 93/05452 | 3/1993 | | WO | WO 98/26584 | 6/1998 |
| WO | WO 93/11638 | 6/1993 | | WO | WO 98/27723 | 6/1998 |
| WO | WO 93/11639 | 6/1993 | | WO | WO 98/28906 | 7/1998 |
| WO | WO 93/11640 | 6/1993 | | WO | WO 98/31148 | 7/1998 |
| WO | WO 93/23957 | 11/1993 | | WO | WO 98/37695 | 8/1998 |
| WO | WO 94/13107 | 6/1994 | | WO | WO 98/39893 | 9/1998 |
| WO | WO 94/14281 | 6/1994 | | WO | WO 98/41020 | 9/1998 |
| WO | WO 94/14282 | 6/1994 | | WO | WO 98/43183 | 10/1998 |
| WO | WO 94/14283 | 6/1994 | | WO | WO 98/43406 | 10/1998 |
| WO | WO 94/14284 | 6/1994 | | WO | WO 98/47279 | 10/1998 |
| WO | WO 94/21085 | 9/1994 | | WO | WO 98/48566 | 10/1998 |
| WO | WO 94/23383 | 10/1994 | | WO | WO 98/56172 | 12/1998 |
| WO | WO 94/29811 | 12/1994 | | WO | WO 98/56712 | 12/1998 |
| WO | WO 95/01056 | 1/1995 | | WO | WO 99/01984 | 1/1999 |
| WO | WO 95/01057 | 1/1995 | | WO | WO 99/04561 | 1/1999 |
| WO | WO 95/01058 | 1/1995 | | WO | WO 99/07142 | 2/1999 |
| WO | WO 95/01059 | 1/1995 | | WO | WO 99/14947 | 3/1999 |
| WO | WO 95/06389 | 3/1995 | | WO | WO 99/18722 | 4/1999 |
| WO | WO 95/07003 | 3/1995 | | WO | WO 99/22502 | 5/1999 |
| WO | WO 95/10910 | 4/1995 | | WO | WO 99/29109 | 6/1999 |
| WO | WO 95/15649 | 6/1995 | | WO | WO 99/30491 | 6/1999 |
| WO | WO 95/15657 | 6/1995 | | WO | WO 99/31480 | 6/1999 |
| WO | WO 95/15658 | 6/1995 | | WO | WO 99/33265 | 7/1999 |
| WO | WO 95/16568 | 6/1995 | | WO | WO 99/39280 | 8/1999 |
| WO | WO 95/19092 | 7/1995 | | WO | WO 99/45700 | 9/1999 |
| WO | WO 95/26608 | 10/1995 | | WO | WO 99/45701 | 9/1999 |
| WO | WO 95/28055 | 10/1995 | | WO | WO 99/45702 | 9/1999 |
| WO | WO 95/28799 | 10/1995 | | WO | WO 99/52285 | 10/1999 |
| WO | WO 95/30961 | 11/1995 | | WO | WO 99/56466 | 11/1999 |
| WO | WO 95/31069 | 11/1995 | | WO | WO 99/56473 | 11/1999 |
| WO | WO 95/32583 | 11/1995 | | WO | WO 99/60783 | 11/1999 |
| WO | WO 95/32585 | 11/1995 | | WO | WO 99/60789 | 11/1999 |

| | | |
|---|---|---|
| WO | WO 00/02380 | 1/2000 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/14951 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/40025 | 7/2000 |
| WO | WO 00/49801 | 8/2000 |
| WO | WO 00/57645 | 9/2000 |
| WO | WO 00/59220 | 10/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/19086 | 3/2001 |
| WO | WO 01/35662 | 5/2001 |
| WO | WO 01/46869 | 6/2001 |
| WO | WO 01/50743 | 7/2001 |
| WO | WO 01/58158 | 8/2001 |
| WO | WO 01/75649 | 10/2001 |
| WO | WO 01/89213 | 11/2001 |
| WO | WO 02/31731 | 4/2002 |
| WO | WO 02/084992 | 10/2002 |

OTHER PUBLICATIONS

U.S. Appl. No. 09/332,244, filed Jun. 11, 1999, Ellis et al.
U.S. Appl. No. 09/356,268, filed Jul. 16, 1999, Rudnick et al.
"272OR Satellite Receiver User's Guide," General Instrument, 1991, pp. 58-61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Development Study and Research Report on New Media Interface Technology: Status & Issues Related to Combining Databases & New Media," Japan Society of Data Communication, Mar. 1986.
"Dial M for Movie", Funkschau 11/94 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
"'Duck Tales,'(1987)[TV Series 1987-1990]," Internet Movie Database (IMDB) [Retrieved on Apr. 7, 2007].
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http://www.atvef.com/library/spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).

"Getting Started" Installation Guide, "Using StarSight 1" Manual, and Remote Control "Quick Reference Guide.".
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
"James Sorce, David Fay, Brian Raila and Robert Virzi, Designing a Broadband Residential Entertainment Service: A Case Study," GTE Laboratories Incorporated, undated, pp. 141-148.
"Lists> What's on Tonite! TV Listings (fwd)," Internet article (on line), Jan. 28, 1995, XP 002378869 [Retrieved on Apr. 28, 2006].
"MSI Datacasting Systems," TV Communications Journal, Jan. 1973.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.
"PCT—Notification of transmittal of International Preliminary Examination Report," International Application No. PCT/US97/07449, Feb. 12, 1999, pp. 1-10.
"Prevue Networks and OpenTV(R) Agree to Work Together on Deploying Interactive Program Guides Worldwide," from the internet at http://www.opentv.com/news/prevuefinal.htm, printed on Jun. 28, 1999.
"Probe XL Brochure, Auto Tote Systems Inc.," (Newark, Delaware) (undated) 57 pgs.
"Rewind, reply and unwind with new high-tech TV devices," by Lawrence J. Magid, LA Times. This document was printed from the internet on Jun. 6, 1999 and bears a date of May 19, 1999.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14, 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
"TV Listings Functional Spec.," Time Video Information Services, Inc., undated.
*"Using StarSight 2," Instruction Manual, StarSight Telecast, Inc., StarSight CB 1500 Customer Letter, 1994.
"Windows 98 Feature Combines TV, Terminal and the Internet," New York Times, Aug. 18, 1998.
"Prodigy Launches Interactive TV Listing", Apr. 22, 1994 public Broadcasting Report.
*"StarSight Interactive Television Program Guide III" Jim Leftwich and Steve Schein, Functional/ Interactional Architecture Specification Document, Orbit Interaction, Palo alto, California, Published before Apr. 19, 1995.
*"StarSight Interactive Television Program Guide IV" Jim Leftwich and Steve Schein, Functional/ Interactional Architecture Specification Document, Orbit Interaction, Palo Alto, California, Published before Apr. 19, 1995.
"StarSight Interactive Television Program Guide" Jim Leftwich, Willy Lai & Steve Schein Published before Apr. 19, 1995.
*"TV Guide Online Set for Fall", Entertainment Marketing Letter, Aug. 1994.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).
Baer, R.H, "Innovative Add-On TV Products," IEEE Transactions on Consumer Electronics, vol. CE-25, Nov. 1979, pp. 765-771.
Bensch, U., "VPV Videotext Programs Videorecorder," IEEE Paper, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present The CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiffs Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiff's Exhibit 289).
CableData, Roseville Consumer Presentation, Mar. 1985.
Carne, E.B., "The Wired Household," IEEE Spectrum, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Cox, J. et al, "Extended Services in a Digital Compression System," Proceedings from Eleven Technical Sessions: 42nd Annual Convention and Exposition of the National Cable Television Association, Jun. 1993, pp. 185-191.
Damouny, N. G., "Teletext Decoders—Keeping Up With the Latest Advances," IEEE Transactions on Consumer Electronics, vol. CE-30, No. 3, Aug. 1984, pp. 429-435.
*Declaration Under 37 C.F.R. § 1.132 of Richard E. Glassberg, signed Oct. 20, 2006, filed Oct. 24, 2006, from U.S. Appl. No. 10/346,266.
DiRosa, S. "BIGSURF Netguide", Jul. 1995, vol. 3.1 (Sections 18,21, and 28—renumbered as pp. 1-27).
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations-und Datenangebote beim digitalen Fernsehen—EPG Und 'Lesezeichen'," RTM Rundfunktechnische Mitteilungen, Jun. 1997, vol. 41, pp. 67-72.
European Search Report dated Nov. 19, 2002 from European Application No. 989446111.7.
European Telecommunication Standard, "Electronic Programme Guide (EPG); Protocol for a TV Guide using electronic data transmission," pp. 1-45, sections 1-11.12.7 and annex A-P, bearing a date of May 1997.
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neuman, Oberlies & Schadwinkel, "Videotext Programmiert Videorecorder," Rundfunktechnischen Mitteilungen, (Braodcast Engineering Reports), vol. 26 No. 6, pp. 254-257, Nov.-Dec. 1982.
*Installation Guide, "Getting Started 1" Manual, and Remote Control "Quick Reference Guide".
Instruction Manual "Using StarSight 2" Published before Apr. 19, 1995.
Intstrument Manual, "Using StarSight 2," StarSight Telecast, Inc., StarSight CB 1500 Customer Letter, 1994.
Instrument Manual, "Sonic The Hedgehog," Sega of America, 1992.
James, A., "Oracle—Broadcasting the Written Word," Wireless World, Jul. 1973, vol. 79 No. 1453, pp. 314-316.
Japanese Abstract of Japanese Publication No. 9037151, published Feb. 7, 1997.
Judice, C.N., "Move Over Cable, Here Comes Video Via Voice Lines," Network World, Sep. 1986, p. 26.
Kai et al "Development of a Simulation System for Integrated Services Television," Report from Information Processing Society of Japan, Japan, Sep. 13, 1996, vol. 96, No. 90 pgs.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operatinf system within the Cable Computer in 1985 (Plaintiff's Exhibit 298).
Listing of computer code for Video HTU Program (Plaintiff's Exhibit 299).
Lowenstein, R.L. and Aller, H.E., "The Inevitable March of Videotex," Technology Review, vol. 88, Oct. 1985, p. 22.
M/A-COM, Inc., "Videocipher II Satellite Descrambler Owner's Manual," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiffs Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell, R.G., "Tac Timer," 1986 NCTA Technical Papers, pp. 203-206.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
Office Actions and Replies from U.S. Appl. No. 10/453,388.
Pfister, Larry T., "Teletext: Its Time Has Come," Prepared for The IGC Videotext / Teletext Conference, Andover, Massachusetts, Dec. 14, 1982, pp. 1-11.
Preview Guide Brochure, Spring 1984.
Preview Guide Brochure, Spring 1994.
Rayers, D.J., "Telesoftware by Teletext," 1984 IEEE Conference Papers, vol. 240, p. 323.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland Dec. 15, 1994, 1 pg.

Schlender, B.R., "Couch Potatoes! Now Its Smart TV," Fortune, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic, Dec. 1984.
Sunada, K. et al, "Teletext Color Television Receiver Model C-29M950, C26M940," NEC Home Electronics, NEC Giho, 1987.
Supplementary European Search Report for Application No. EP 98 93 5889, completed on Sep. 28, 2001.
Sussman, A. "GTE Tunes in to Home TV Shopping," PC Week, Jun. 28, 1988, p. C15.
Tech Notes: Product Updates from M/A-COM Cable Home Group, "Videocipher Owner's Manual Update," Issue No. 6, Feb. 1986.
Technical White Paper, "Open TV™ Operating Environment," (© 1998 OpenTV Inc.), pp. 1-12.
Transcript of the Deposition of John Roop, Jun. 2001, p. 608.
Transcript of the Deposition of John Roop, Oct. 1996, pp. 186-187.
Trial testimony of Michael Axford, *Prevue Interactive, Inc. and United Video Satellite Group, Inc. v. StarSight Telecast, Inc.*, May 9, 1998, pp. 186-187, 295-315, and 352-357.
Various publications of Insight Telecast, 1992 and 1993.
Veith, R.H., "Television's Teletext," Elsevier Science Publishing Co., Inc, 1983, pp. 13-20, 41-51.
Videocassette of Mini Theatre, (Plaintiff's Exhibit 327).
Videocipher Stipulation, May 1996.
VideoGuide, "VideoGuide User's Manual," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
Contents of the website of StarSight Telecast, Inc. (http://www.StarSight.com) as of Apr. 21, 2004.
Extended European Search Report for EP10183222 dated Jun. 20, 2011.
Office Action dated Apr. 29, 2010 and Preliminary Amendment filed Aug. 20, 2007 in U.S. Appl. No. 11/894,590, filed Aug. 20, 2007.
Dinwiddle et al., "Combined-User Interface for Computers, Televison, Video Recorders, and Telephone, etc." IBM Technical Disclosure Bulletin, vol. 33(3B), pp. 116-118 (1990).
Fuller, C., Streaming gijutsu no genzai Web video system no gaiyou [Current Streaming Technology, Outline of Web Video System], UNIX Magazine, Japan, ASCII K.K., Mar. 1, 2000, vol. 15, No. 3, p. 65-72.
International Search Report for PCT/US95/11173 dated Dec. 14, 1995.
International Search Report for PCT/US99/04163 dated Jun. 23, 1999.
International Search Report for PCT/US99/08842 dated Jul. 7, 1999.
IPG Attitude and Usage Study, prepared by Lieberman Research Worldwide for Gemstar-TV Guide International, Oct. 2002.
Letter from StarSight Telecast, Inc. to a StarSight IPG subscriber (with subscriber name, address and account No. redacted) notifying the subscriber of termination of the StarSight IPG, 2003.
Miller, Matthew D., "A Scenario for the Deployment of Interactive Multimedia Cable Television Systems in the United States in the 1990's", Proceedings of the IEEE, vol. 82, pp. 585-589, Apr. 1994.
Oberlies, et al.; "VPS-Anzeige Und Uberwachungsgerat", Rundfunktechnische Mitteilungen, vol. 30, No. 1 Jan. 1986-Feb. 1986, Norderstedt (DE).
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 8, 1999.
Patent Abstracts of Japan vol. 017, No. 494, Sep. 7, 1993 and JP 05 122692 A (Pioneer Electron Corp), May 18, 1993.
Patent Abstracts of Japan vol. 098, No. 001, Jan. 30, 1998 and JP 09 247565 A (Sony Corp), Sep. 19, 1997.
Prevue Networks, Inc. Promotional Materials, 1994.
RCA Satellite Receiver Users Manual, 2001.
Sato, T. et al., "WWW jou no eizou browsing kikou no teian to Jitsugen [A Proposal for A Video Browsing Mechanism on World Wide Web and its Implementation]," Japan Society for Software Science and Technology, collection of 14th convention articles, Japan, Japan Society for Software Science and Technology, Sep. 30, 1997, p. 193-196.
Transcript of the testimony of Brian Klosterman, May 1997, pp. 1700-1981.
Transcript of the testimony of Michael Faber and Larry Wangberg, May 1996, pp. 554-743.
Winkler, M., "Computer Cinema: Computer and video: from TV converter to TV studio," Computerkino, (translation) Exhibit NK 13 of TechniSat's nullity action against EP'111, Issue 10, pp. 100-107 (1992).
Provisional U.S. Appl. No. 60/179,548, filed Feb. 1, 2000.
DAVIC Digital Audio-Visual Council, DAVIC 1.5 Specification, Baseline Document 1, Revised 4.0, Applications for Home Storage and Internet Based Systems, Published by Digital Audio-Visual Council 1995-1999.
Minutes of Oral Proceedings in EP Appeal No. T 1288/04 Held on May 3, 2004 for EP Application No. EP002009741.0, Applicant E-Guide, Inc.
No subject, "Tom Schauer (tschauer@moscow.com)Thu, Sep. 28, 1995 16:46:48-700," XP-002378870 [Retrieved from the Internet Apr. 28, 2006].
STORit, Report on the IBC'99 Demonstration, Deliverable #8 AC312/phi/prl/ds/p/008b1 Oct. 1999.

* cited by examiner

FIG. 3

| 10:03PM | ○ WATCH  ○ RECORD | |
|---|---|---|
| PIP WINDOW | REMEMBER WENN: WENN SUPPLIES PROGRAMMING TO A RIVAL STATION. | |
| DISPLAYING PANEL AD VIDEO FOR LAST CHANNEL VIEWED | AMC [23]  9:00PM (30m)  cc  ℹ️ | |
| | GRID \| SORT \| SCHEDULE \| MESSAGES | |
| AD WINDOW 1 | SAT | 9:00PM | 9:30PM |
| DISPLAYING PANEL AD  ℹ️ | LAST CHANNEL | | |
| | ABC | EARLY EDITION | |
| | FOX | MISS AMERICA PAGEANT | |
| | CBS | AMER MOST WANTED | |
| AD WINDOW 2 | MTV | EARLY EDITION | |
| DISPLAYING PANEL AD  ℹ️ | UPN | SPICE GIRLS CONCERT TONIGHT | |
| | PBS | WALKING TALL | |
| | AMC | ON GOLDEN POND | REMEMBER... \| YOUNG PHILA |
| | ESPN | COLLEGE FOOTBALL | |

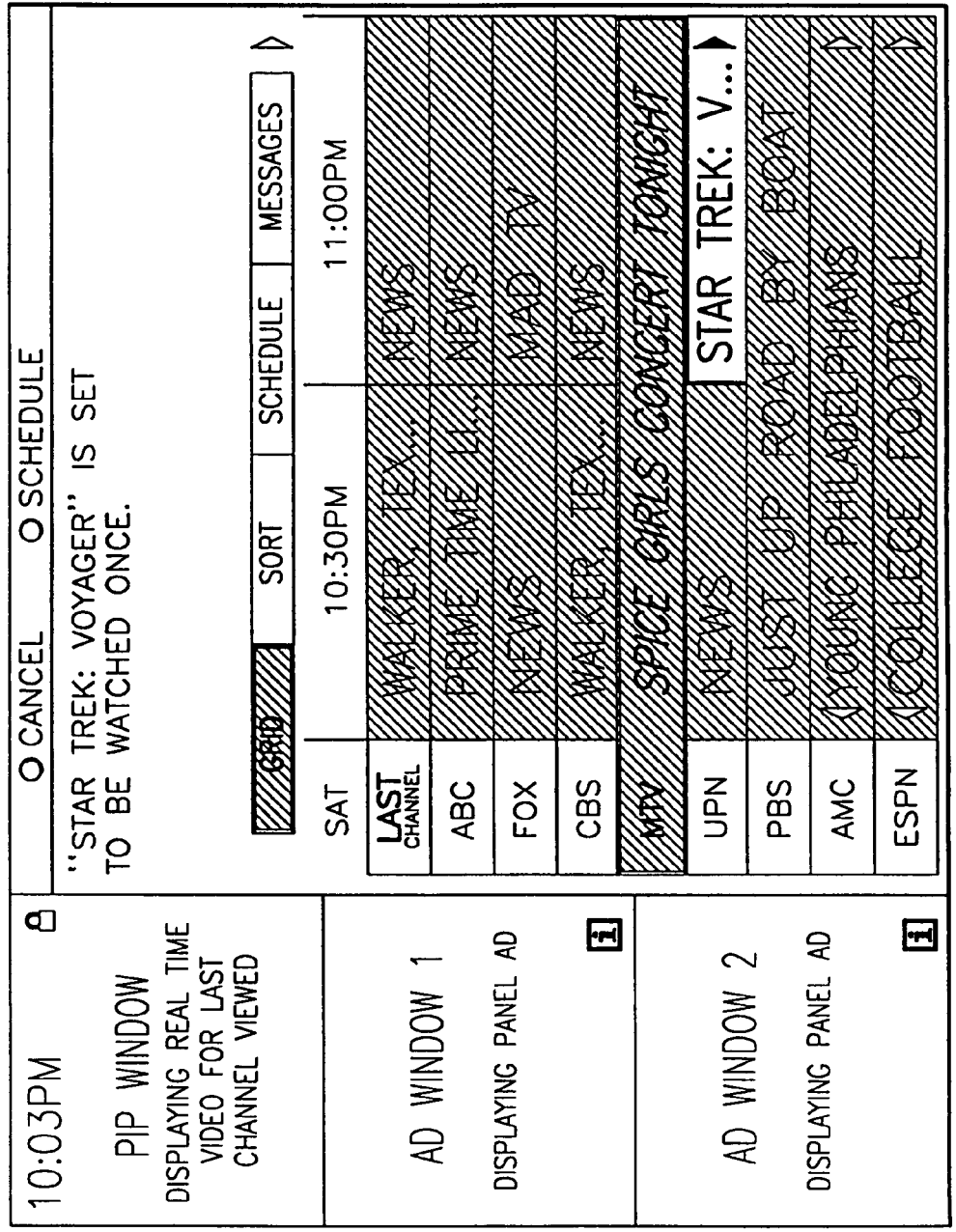

FIG. 8

| | ○ WATCH ○ RECORD | |
|---|---|---|
| 10:03PM | ON GOLDEN POND: COMEDY-DRAMA 1981*** KATHARINE HEPBURN, PG | |
| PIP WINDOW DISPLAYING REAL TIME VIDEO FOR LAST CHANNEL VIEWED | PBS [10]   8:00PM (2h 30m) | |
| | GRID / SORT / SCHEDULE / MESSAGES | |
| | MOVIES: ALL | TUES, SEPT 23 |

| | | 8:00PM |
|---|---|---|
| PBS | ON GOLDEN POND | 8:00PM |
| TNT | THE SEVENTH SIGN | 8:00PM |
| USA | THE ACCUSED | 8:00PM |
| AMC | YOUNG PHILADELPHIA | 9:30PM |
| TNT | ALIEN 3 | 10:00PM |
| USA | CLOVER | 10:00PM |
| AMC | FOXFIRE | 1:00PM |
| ABC | AND THEN THERE | 4:00PM |
| ABC | FALLING FROM SKY... | 9:00PM |

AD WINDOW 1
DISPLAYING PANEL AD

AD WINDOW 2
DISPLAYING PANEL AD

FIG. 9

| 10:03PM | ○ WATCH ○ RECORD |
|---|---|
| PIP WINDOW<br><br>DISPLAYING REAL TIME VIDEO FOR LAST CHANNEL VIEWED | MISS AMERICA PAGEANT: WOMEN FROM 50 STATES VIE FOR THE CROWN IN ATLANTIC CITY. SPECIAL<br><br>ABC [13]  9:00PM (1h)  cc<br><br>PlusCode: 9990<br><br>NEXT ON ABC [13]<br>10:00PM  PRIME TIME LIVE<br>11:00PM  NEWS<br>11:30PM  NIGHTLINE<br>12:05AM  PAID PROGRAMMING<br>12:35AM  PATRIOTS PREVIEW<br>1:05AM  KWIK WITZ<br>1:35AM  THE CAPE<br>2:35AM  FLIPPER<br>3:35AM  HEADLINE NEWS<br>6:00AM  PREVENTION BODYSENSE<br>6:30AM  REBECCA'S GARDEN<br>7:00AM  HOUR OF POWER<br>8:00AM  GMA SUNDAY |
| AD WINDOW 1<br><br>DISPLAYING PANEL AD | |
| AD WINDOW 2<br><br>DISPLAYING PANEL AD | |

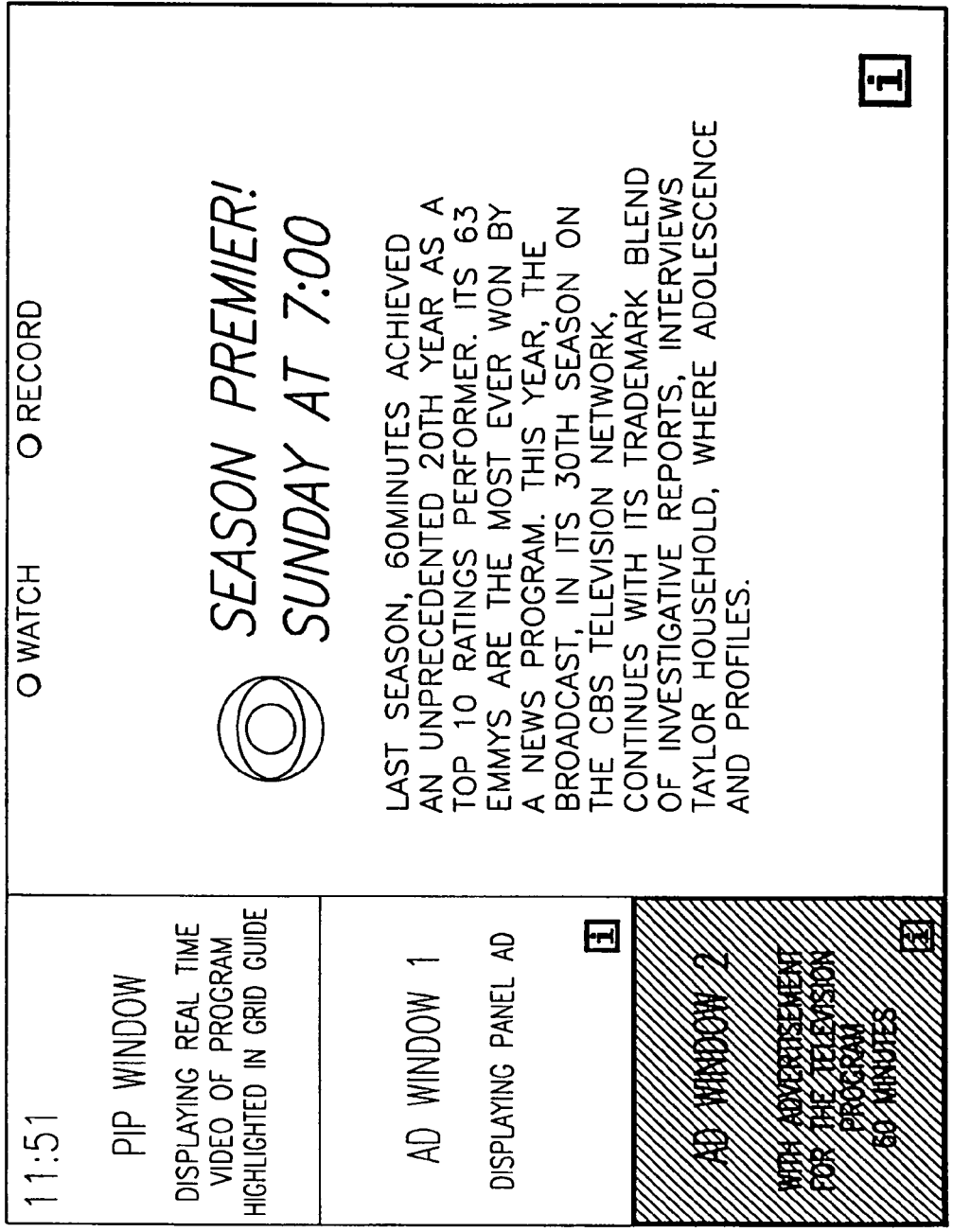

SYSTEM AND METHOD FOR DISPLAYING ADVERTISEMENTS RESPONSIVE TO EPG INFORMATION

CROSS-REFERENCE TO RELATED APPLICATIONS

This application is a continuation of U.S. patent application Ser. No. 10/066,811, filed Feb. 4, 2002, which is a continuation of U.S. patent application Ser. No. 09/595,216, filed Jun. 16, 2000 now abandoned, which is a continuation of U.S. patent application Ser. No. 09/120,488, filed Jul. 21, 1998 now U.S. Pat. No. 6,177,931, which claims priority of U.S. Provisional Patent Application Nos. 60/055,237, filed Aug. 12, 1997, 60/068,375, filed Dec. 22, 1997, 60/053,330, filed Jul. 21, 1997, 60/055,761, filed Aug. 14, 1997, 60/061,119, filed Oct. 6, 1997, 60/071,811, filed Jan. 20, 1998, 60/071,812, filed Jan. 20, 1998, 60/071,882, filed Jan. 20, 1998, and 60/034,784, filed Dec. 19, 1996 and PCT International Application No. PCT/US97/23852, filed Dec. 19, 1997, the disclosures of all of which are incorporated herein by reference, as if fully stated here, for all purposes.

FIELD OF THE INVENTION

The present invention relates generally to television systems, and more particularly, to the display of, and recording control interface with, television programs, video, advertising information and program scheduling information.

BACKGROUND OF THE INVENTION

Television viewers have historically analyzed the information provided by television program schedule guides to select television programs to watch. Historically, television program schedule guides have listed the available television programs by day of the week, time of day, channel, and program title. Historically, only hardcopy television program schedule guides were available. More recently, as illustrated by the Levine Patent, U.S. Pat. No. 4,908,713, television program guides have become available in electronic form.

The earliest versions of on-screen electronic program guides ("EPG") provided for the storage of program schedule information in an electronic memory connected to the television receiver and generally provided for the on-screen formatting and display of the program schedule information on the television screen. The early EPGs typically overlaid the television programming. Furthermore, viewer interaction capabilities with early EPGs was extremely limited.

Later EPGs provided viewer-to-EPG interaction improvements and provided Picture-In-Guide ("PIG") display of the television program simultaneous with the display of the EPG. International Application No. PCT/US95/11173 (International Publication No. WO 96/07270), the disclosure of which is incorporated by reference herein for all purposes, illustrates such an improvement.

SUMMARY OF THE INVENTION

The present invention is an improvement over previous EPGs in that it provides, among other things:
A. Improved viewer interaction capabilities with the EPG;
B. Improved viewer control of video recording of future-scheduled programming;
C. Improved features to the EPG display and navigation;
D. Parental control of the EPG display;
E. Improved television program information access by the viewer;
F. Improved opportunities for the commercial advertiser to reach the viewer;
G. Improved product information access by the viewer;
H. Creation of a viewer's profile;
I. Utilization of viewer profile information to customize various aspects of the EPG; and J. Utilization of viewer profile information to provide customized presentation of advertising to the viewer.

DESCRIPTION OF THE DRAWINGS

These and other features, aspects, and advantages of the present invention will become better understood with regard to the following description, appended claims, and accompanying drawings where:

FIG. 3 is a graphic representation of a sample on screen EPG display depicting the EPG's on-screen Grid Guide in the programming scrolling mode.

FIG. 5 is a graphic representation of a sample on screen EPG display depicting the EPG in the Watch Scheduling mode.

FIG. 8 is a graphic representation of a sample on screen EPG display depicting the second-level theme screen display of the EPG.

FIG. 9 is a graphic representation of a sample on screen EPG display depicting the Channel Guide function of the EPG.

FIGS. 10a and 10b are graphic representations of sample on screen EPG displays depicting one embodiment of the feature of presenting additional information concerning the subject matter of a highlighted Panel Ad Window.

DETAILED DESCRIPTION OF THE INVENTION

The disclosure of International Application WO96/07270, published on Mar. 7, 1996 is incorporated fully herein by reference. The present invention is an improvement on the electronic program guide (EPG) disclosed therein. The apparatus disclosed in the referenced PCT application is used to generate the screen displays described below.

Figure 1:
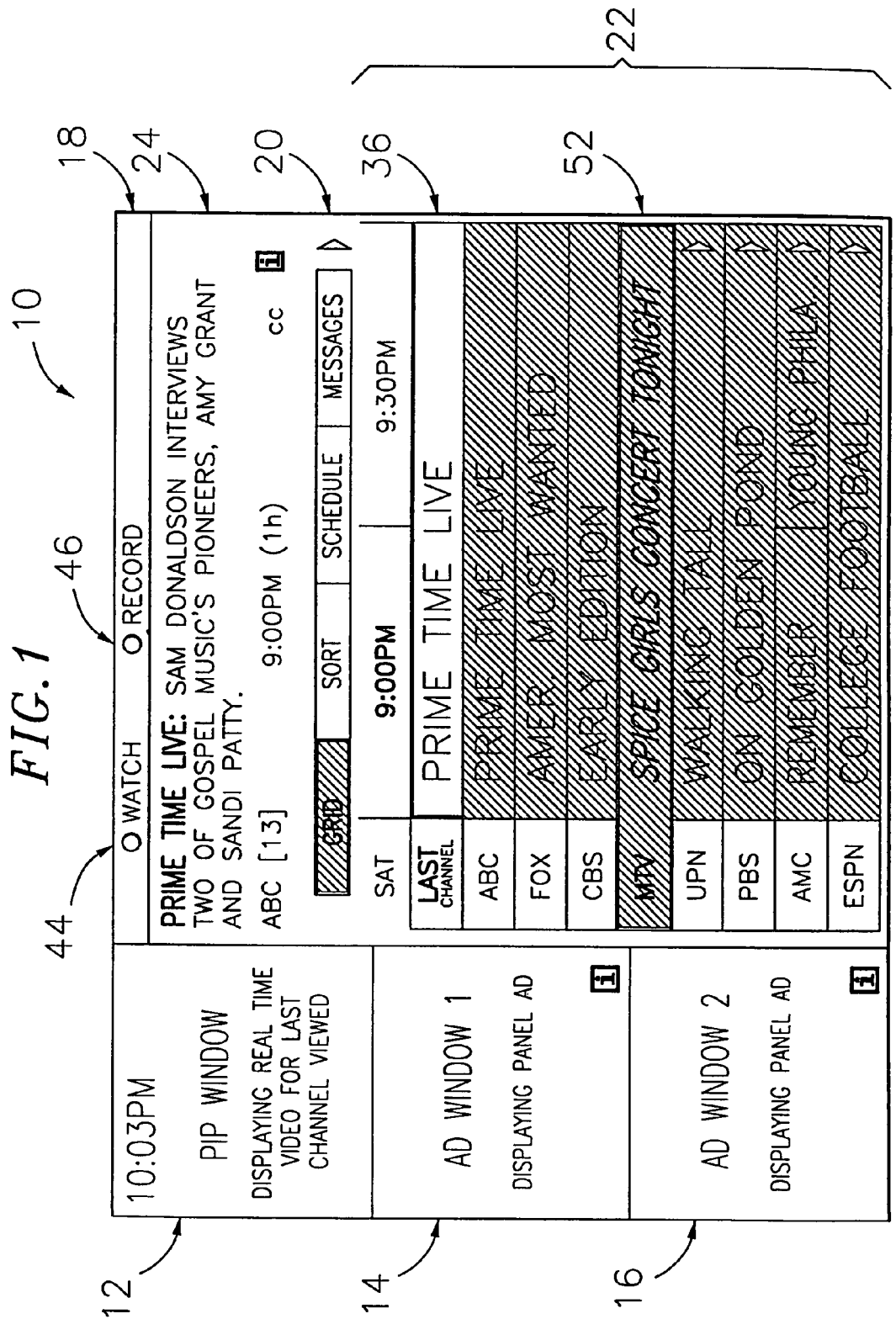
FIG. 1 is a graphic representation of a sample screen display of the EPG.

In FIG. 1 of the drawing, one embodiment of the EPG with Ad Window and Advertising Messages is shown. In FIG. 1, a television screen display 10 is shown. Display 10 could be generated by a conventional television receiver with interlaced scan lines, by a VCR, by a PC monitor with progressive scan lines, or by another other type of video display device. In the upper left hand corner of the screen is a PIP window 12. Below window 12 are Panel Ad Windows 14, and 16 ("Ad Windows"). Windows 12, 14, and 16 each typically occupy about ⅑ of the total screen area. The remainder of the screen area is typically occupied (moving from top to bottom of the screen) by an action key bar 18, a navigation bar 20, a grid guide 22 ("Grid Guide"), and an information box 24 (the "detailed information area). In the embodiment pictured in FIG. 1, the position of the windows, and other user interface features, including the action key bar, navigation bar and Grid Guide, are fixed. In another embodiment of this invention, as is described further below, the position and size of the windows and other user interface features are customizable by the viewer.

Figure 2:
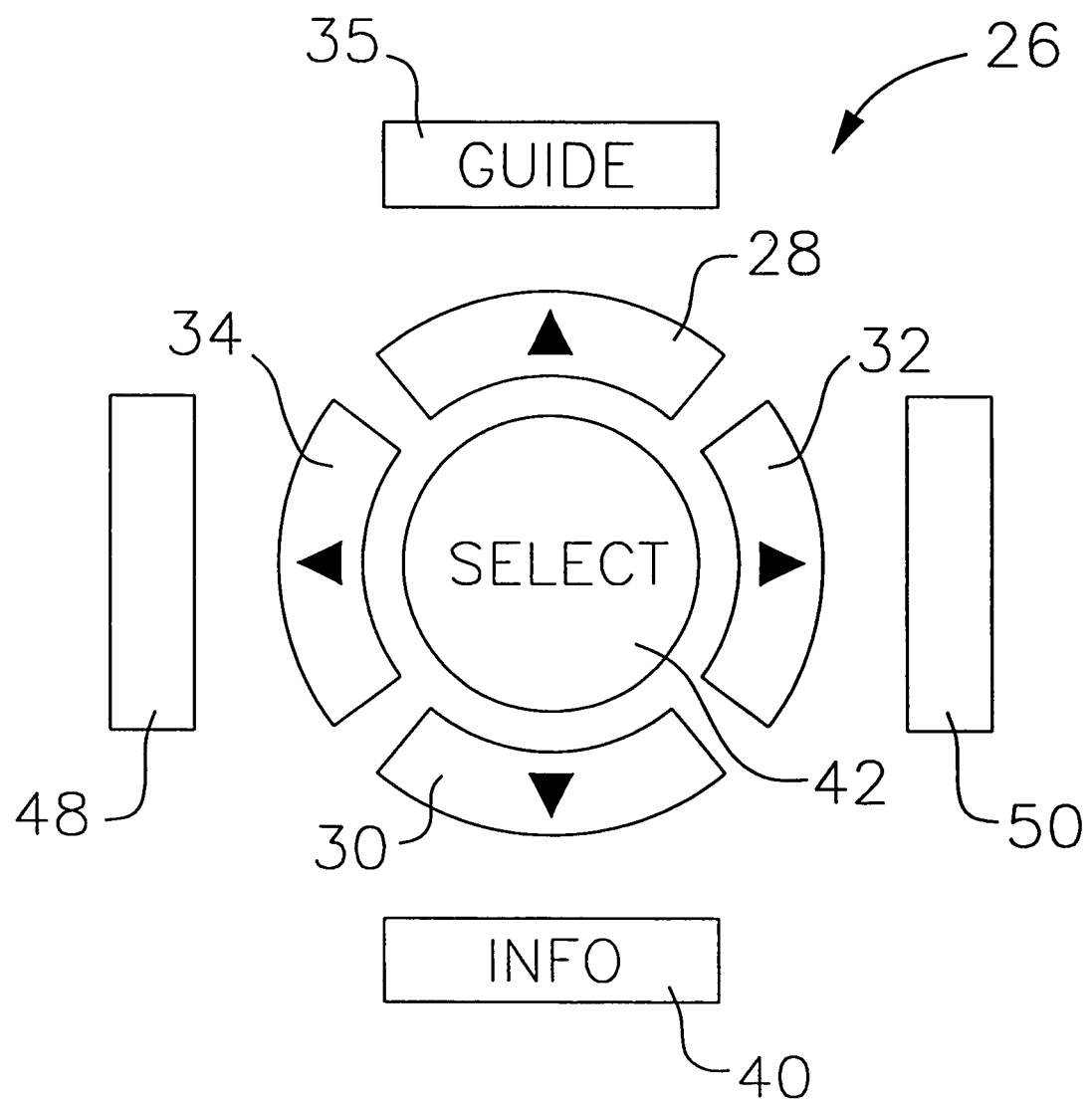
FIG. 2 is a drawing of a portion of a remote control device that shows keys for activating various functions of the EPG.

In FIG. 2 of the drawing, one embodiment of a remote controller 26 for activating the functions of display 10 is shown. Remote controller 26 could have other keys for activating the functions of a user video device, such as a television receiver, a VCR, or a cable box. Remote control 26 has up, down, right, and left arrows keys 28, 30, 32, and 34, respectively, for controlling the movement of a cursor 36 on display 10. Cursor 36 can select, i.e., highlight, any of windows 12, 14, or 16 by pressing arrow keys 28 to 34, any of the titles and channels in Grid Guide 22 by pressing arrow keys 32 and 34, or navigation bar 20 by pressing arrow keys 32 and 34. Windows 12, 14, and 16 are highlighted by adding a border around the window or changing the color of the border, if the border is permanent. The titles and channels in Grid Guide 22 and navigation bar 20 are highlighted by changing color.

Highlighting of windows and/or viewer selections from the Grid Guide and/or navigation and EPG on screen display components may be accomplished in a number of other ways. For instance, the border of a selected window, or the selected Grid Guide or navigation component, can be made to appear to flash. Another way to highlight a viewer selection is to make the selected window or feature appear to become brighter than the rest of the on screen display. Yet another way to highlight a viewer selection is to blur all portions of the on screen display, except for the viewer selected component. Still another way to highlight a viewer selection is to make all portions of the on screen display, except for the viewer selected component, appear transparent. Still yet another way to highlight a viewer selection is to add animation to the selected component. When a portion of the EPG is selected, the system issues graphic display commands to the on screen display (OSD) controller to implement one or more of the desired enhancement technique(s).

The viewer enters the Guide Mode illustrated in FIG. 1 by pressing a "guide" key 35 and returns to the full screen Television Mode by pressing key 35 again or by pressing the "select" key. A real time television program is displayed in window 12. A translucent overlay of the PIP window 12 can display the title, channel (local number and/or station name), and status (locked or unlocked) of window 12 over the television program so the viewer can still see the entire image.

The PIP Window can be locked or unlocked. The "lock/unlock" mode is user controlled. To lock or unlock the PIP Window, the viewer can use a PIP button on the remote control device, or can highlight and press the Lock/Unlock EPG action button. The lock/unlock status is recorded and maintained until the status is reset by the viewer. That is, the lock/unlock status for the PIP Window in the EPG is maintained when the viewer leaves the Guide and later re-enters the Guide, including when the viewer turns off the television. If the viewer selects the "lock" status, the last channel to which the tuner was set in the PIP Window continues to be displayed regardless of the actions exercised by the viewer. In the unlocked status, the channel highlighted by cursor 36 in Grid Guide 22 is displayed if the Grid Guide is displaying currently telecast programs and the last currently telecast channel that was highlighted is displayed if the Grid Guide is displaying future programs.

There are generally three results to leaving the Guide, depending upon the way the viewer leaves the Guide. If the viewer, while in the EPG, wants to watch in full screen mode the program shown in the PIP Window, then the viewer can press the Guide button on the remote control device. If the viewer, while in the EPG, highlights a particular channel in the Grid Guide, and then presses the "select" button, the viewer will leave the Guide to view in the full screen mode the television program that the viewer highlighted in the Guide. If the viewer, while in the EPG, presses the "clear" or "cancel" button on the remote control device, then the viewer will leave the Guide and return to the television program that the viewer was watching immediately before entering the Guide.

Typically, an ad for a future telecast program is displayed in window 14. This ad is linked to the time and channel of the program in RAM so the viewer can watch or record the program automatically by pressing the blue left action button to watch the program, or the green right action button to record the program.

Typically, an ad for a product or service is displayed in window 16. This ad is linked to more information about the product or service in RAM so the viewer can read one or more pages about the product or service in window 16 by pressing an "info" key 40 one or more times. Alternatively, this ad is linked to the time and channel in RAM that an infomercial about the product or service will be telecast so the viewer can watch or record the infomercial automatically by pressing "select" key 42.

Bar 18 displays a blue button 44 and/or a green button 46 with legends that depend upon the context of the information displayed on the screen. Remote controller 26 has corresponding keys 48 and 50, respectively, to activate the functions represented by blocks 44 and 46.

From window 12, 14, or 16 the viewer moves to grid guide 22 by pressing arrow key 32. (From grid guide 22 the viewer moves to window 12, 14, or 16 by pressing arrow key 34.) In grid guide 22 the viewer moves cursor 36 to highlight one of the nine tiles in which channel and title are displayed by pressing arrow keys 28 and 30. The viewer can view program listings scheduled at future times by pressing keys 32 or 34 to move horizontally about the Grid.

From grid guide 22 the viewer moves to navigation bar 20 by pressing arrow key 28. Initially, the center button is highlighted. To highlight a different button, arrow key 32 or 34 is pressed. To enter the screen represented by the highlighted button, "select" key 42 is pressed.

In grid guide 22 details about the program represented by the highlighted tile are displayed. If more information is available this fact is indicated by an icon and such information is displayed in the area occupied by grid guide 22, instead of the grid guide by pressing "info" key 40. To return to the grid guide, "info" key 40 is pressed again. After an action button has been pressed or an icon on navigation bar 20 has been activated, an instructional prompt may be substituted for the program information in information box 24.

In addition to the tiles representing television programs, a virtual channel ad can be displayed in grid guide 22 on a tile 52. A virtual channel ad may promote, for instance, a current or future television program. Such a virtual channel ad for a television program is linked to the time and channel of the program in RAM so the viewer can watch or record the program automatically by pressing "select" key 42 in the manner described in the referenced application. More than one virtual channel ad may be stored in RAM, but preferably only one such ad is displayed at a time.

Reference is made to the TV Guide Plus+ 98 User Interface Specification v1.42stv, which is attached hereto as Appendix A, the disclosure of which is incorporated by reference as if fully stated herein, for more description of the invention.

One embodiment of the hardware for this invention includes a circuit board consisting of a gate array that provides all of the control functions for access by the processor (e.g., Motorola 68000), control of memory (dynamic RAM and external ROM), and some peripheral functions such as infrared ("IR") input and output, frequency synthesizer for the paging system, and data acquisition from the paging system. Inside there is a module for creating an on-screen display including a programmable DMA (direct memory access) controller, a color lookup table that provides for a field called a color index that can be used to select a more complicated color (more bits than can be expressed in the bit map), first-in-first-out ("FIFO") memory for ordering the pixels (which allows the system to write the pixels as fast as the system is capable of writing the pixels and then sending the pixels to the display according to a prescribed timing. Included in the chip is a timing subsystem that produces a number of different timing signals of varying frequency—from clocks to long millisecond time measurement, and interrupts. Synchronization signals for the television monitor are also generated by the internal timing subsystem. The system also typically includes circuits for functions including but not limited to: data receiver, memory controller, timing interface with the processor, data deinterleaving, error correcting, and synchronous timing generator with horizontal and vertical counters.

Another feature of one embodiment of the EPG system hardware is that display list hardware is capable of both video input and output on the same DMA hardware. The display processor is comprised of a video section and a FIFO section in an ASIC. The system has multiple clocks. The display memory has the capability to store 8 screen tiles in a horizontal plane.

Described below in more detail are the following improvements to an EPG:

A. Improved viewer interaction capabilities with the EPG, including:
  1. A Variety of Operating Modes.
  2. Joy Stick and Track Ball Viewer Remote Interface.
  3. Contextually Sensitive EPG On-Screen Control Mechanisms.
  4. Watch Scheduling.
  5. "All Channel" Guide Format, Channel Guide Format and "Next"/"Previous" Channel Guide.
B. Improved viewer control of video recording of future-scheduled programming, including:
  1. Recording program displayed in PIP window.
  2. Recording "Regularly."
  3. Record Function rerun filter for "Regularly" recorded programs.
  4. Skip recording instruction.
  5. Automatic Record List Update.
  6. Recording on recordable Digital Video Discs.
  7. Speed Sensitive Tape Capacity.
  8. Record Instruction Conflict Resolution.
  9. Recording from Theme Guides.
C. Improved features to the EPG display and navigation, including:
  1. E-mail.
  2. Multiple Viewable "Windows."
  3. Translucency on-screen effects.
  4. On-screen notifications.
  5. Theme navigation bar.
  6. Improved Scrolling through the EPG and Smooth Scrolling.
  7. "Jumping" in the EPG.
  8. Thematic color-coding of program schedule.
  9. Controllable number of days of programming.
D. Parental control of the EPG display;
E. Improved television program information access by the viewer, including:
  1. Virtual Channel Ad Slots and Ad Window program advertisements.
  2. Additional detailed information for viewer access including link to the Internet.
F. Improved opportunities for the commercial advertiser to reach the viewer, including:
  1. Ad Window product-related video clips and infomercial recording.
  2. Ad Window program-related recording.
  3. Panel Ads.
  4. Virtual Channel Ad Slots.
  5. Placeholder Ads
  6. Full Screen ads.
  7. Automatic watch channel.
  8. Ad Features.
G. Improved product information access by the viewer, including:
  1. Ad Window product detail.
  2. Ad Window product-related recording.
  3. Ad Window program-related recording.
H. Creation of a viewer's profile, including:
  1. Collecting viewer profile information.
  2. Analyzing and characterizing viewer profile information.
I. Utilization of viewer profile information to customize various aspects of the EPG; and J. Utilization of viewer profile information to provide customized presentation of advertising to the viewer.

A. Improved Viewer Interaction Capabilities with the EPG
  1. A Variety of Operating Modes.

Under the improved EPG system, there are multiple modes in which the viewer can operate the television.

a. Television Mode.

In the Television Mode, the viewer watches a full screen display of the television video programming. In one embodiment, in order to enter the EPG, the viewer presses the "Guide" key on the viewer's remote control device. In another embodiment, the EPG Grid Guide is the default mode. In the case where the EPG Grid Guide is the default mode, when the viewer turns the television on, the first thing that the viewer sees is the EPG in Grid Guide Mode as is described more fully below. In one embodiment, at the viewer's option, as identified in the EPG set up procedure, the viewer can override the EPG Grid Guide default mode by selecting to automatically enter the Television Mode whenever the viewer first turns on the television. During setup procedures, the viewer can further instruct the EPG to automatically tune to the last-watched channel as identified when the viewer last turned off the television. The viewer can further instruct the EPG to automatically tune to the viewer's favorite channel, as is deduced from analyzing the viewer's profile information, described below. Alternatively, the viewer can instruct the EPG to automatically tune to a particular channel, e.g., a news channel such as CNN.

b. EPG Grid Guide Mode.

In the EPG Grid Guide Mode, the EPG displays the Grid Guide, or in the alternative, a Channel Guide. The viewer can request that the Grid Guide occupy the entire screen, be displayed over a portion of the screen as an overlay of the video television programming, or, in the preferred embodiment, occupy only a portion of the screen, typically ⅔ of the entire screen, while continuing to show the video television programming in the PIP Window of the screen. In the preferred embodiment, multiple Windows are displayed for the viewer, as are further described below, including at least: the EPG/Grid Guide Window, the PIP Window, and the Ad Window.

Scrolling through the Guide is described below. The viewer can press the "Menu" key on the viewer's remote control device to go to the top of the Guide.

The viewer can return to the full screen display of the video television programming in a number of ways. One way is to press the "Guide" key on the viewer's remote control device. Another way is to press the "Select"" key on the viewer's remote control device when the on-screen highlighting/cursor is highlighting a particular program listing on the Grid Guide for a program that is available for real-time viewing. Another way is to press the "last channel" key on the viewer's remote control device to return to the program the viewer was watching before entering the Guide, or the last program on which the PIP window was locked (an option explained further below).

1.) Theme Guide Function.

The EPG provides various Theme Guides, e.g., sports, movies, news, etc. Each Theme Guide presents program listings associated with a particular theme, e.g., all sports programs. The Theme Guide display format only displays program listings, and consequently channels, for certain times of the day, with content appropriate for the selected theme. For instance, the Sports Theme Guide will display, typically in schedule order, only listings for channels that carry sports programs that are scheduled during a certain period of time, e.g., 48 hours, 8 days, etc.

2.) Record Selection Function.

In the Record Selection Function, also referred to as the Recording Function, the viewer instructs the EPG what programs to add to the Record List, which is the list of programs and related programming schedule information, for programs that the viewer want to have recorded. As is further described below, the viewer can identify the frequency/regularity with which the viewer wants to record each program listed in the Record List.

The viewer can enter the Recording Function in a number of ways. The viewer can press the "Record" key, if there is one, on the viewer's remote control device. Alternatively, the viewer can "press" a "Record" action button on the EPG display.

3.) Watch Scheduling Function.

In the Watch Scheduling Function, also referred to as the Watch Function, the viewer instructs the EPG what programs to add to the Watch List, which is the list of programs and related programming schedule information, for programs that the viewer want to watch. As is further described below, the viewer can identify the frequency/regularity with which the viewer wants to watch each program listed in the Watch List.

The viewer can enter the Watch Function in a number of ways. The viewer can press the "Watch" key, if there is one, on the viewer's remote control device. Alternatively, the viewer can "press" a "Watch" action button on the EPG display.

4.) Data Download Function.

In some embodiments, data for the EPG schedule, and/or supplemental information relevant to the program listings, and/or advertising data, can be downloaded to the memory resident at the viewer's television system. In the preferred embodiment of the download data system, the viewer will ask the EPG to make certain types of information available; the EPG will use an index of where to find the information and will automatically connect to the appropriate data source and will download the information. Data for the EPG schedule, and/or supplemental information relevant to the program listings, and/or advertising data, can be downloaded from various sources. In one embodiment, data is downloaded from the Internet. In other embodiments of the download data system, the viewer is asked to tune to a particular channel at a particular time if the viewer is interested in accessing and downloading particular types of information.

C. Internet Mode.

Not all embodiments require that data be downloaded to the EPG memory. In one embodiment, the EPG scheduling data, supplemental data and/or advertising data and the software to format, display, and navigate the EPG scheduling data, supplemental data and/or advertising data is accessed by the viewer's television system through a direct link between the viewer's television system and the Internet.

In one embodiment of the above-described direct-link to the Internet, the viewer's television is connected to the Internet by telephone line via modem, by cable modem, by other two-way communication device, including wireless modem communication devices and by other conventional methods of communicating with the Internet. The initial connect web site address may be supplied, for instance, through information transmitted to the viewer's television over the vertical blanking interval (the "VBI"). The viewer may also be provided with a selection of multiple EPG Internet web sites. The viewer uses the remote control device to select one of the EPG Internet web sites The viewer's television system is programmed to emulate computer on-line access to the Internet. Once the connection between the viewer's television system and the Internet is made, the user has two-way communication with the on-line Internet service provider of the EPG related information. The user can then navigate through the EPG. Furthermore, in one embodiment, in which keyboard user interface is available, the user can enter chat rooms or other interactive services.

2. Joy Stick and Track Ball Viewer Remote Interface.

The viewing user's video interface (UI) comprises the viewer's remote control device and the television monitor screen display. In one embodiment of the present invention, one improvement in the UI offered by the present invention is the use of a joy stick as a substitute for the traditional remote control device configuration of a circle of four (4) arrow keys (up, down, left and right) with a select key in the center. The joy stick UI provides a user-friendly interface with the EPG. Use of the joy stick is intuitive. The viewer/user does not have to look at the remote once the viewer's finger contacts the remote control joy stick. Accordingly, the viewer can control the UI while simultaneously watching, without interruption, the on-screen display.

In another embodiment of the present invention, one improvement in the UI offered by the present invention is the use of a track ball as a substitute for the traditional remote control device configuration of a circle of four (4) arrow keys (up, down, left and right) with a select key in the center.

In both the track ball and the joy stick embodiments, there is an on-screen "cursor." The viewer uses the track ball or joy stick remote control device to navigate the cursor to any location on the screen, much as a PC user navigates a cursor on a PC terminal window.

3. Contextually Sensitive EPG On-Screen Control Mechanisms.

"Keys," "buttons," menu "bars," and other such visual control mechanism devices are displayed on-screen for the control of the EPG. Typically, the visual control mechanism devices are sensitive to user-interaction. Typically, the viewer uses the UI remote control device to highlight a particular on-screen control device. Typically, the viewer then uses the UI remote control device to select the highlighted on screen control device.

In one embodiment of the present invention, positionally constant on-screen control devices are contextually sensitive. That is, a particular button can be consistently displayed on every screen of the EPG in the same position and with the same color, from one screen to the next, from one mode to the next. With contextually sensitive control devices, even though the on screen control device has the same appearance and placement from one screen to the next and from one mode to the next, the button has a different function, and if selected, will provide a different result, depending upon the screen on which the button appears. In one embodiment, the function of the on-screen control device is textually described next to the control device, or, if the control device is sufficiently large, on the face of the control device.

Figure 4A:
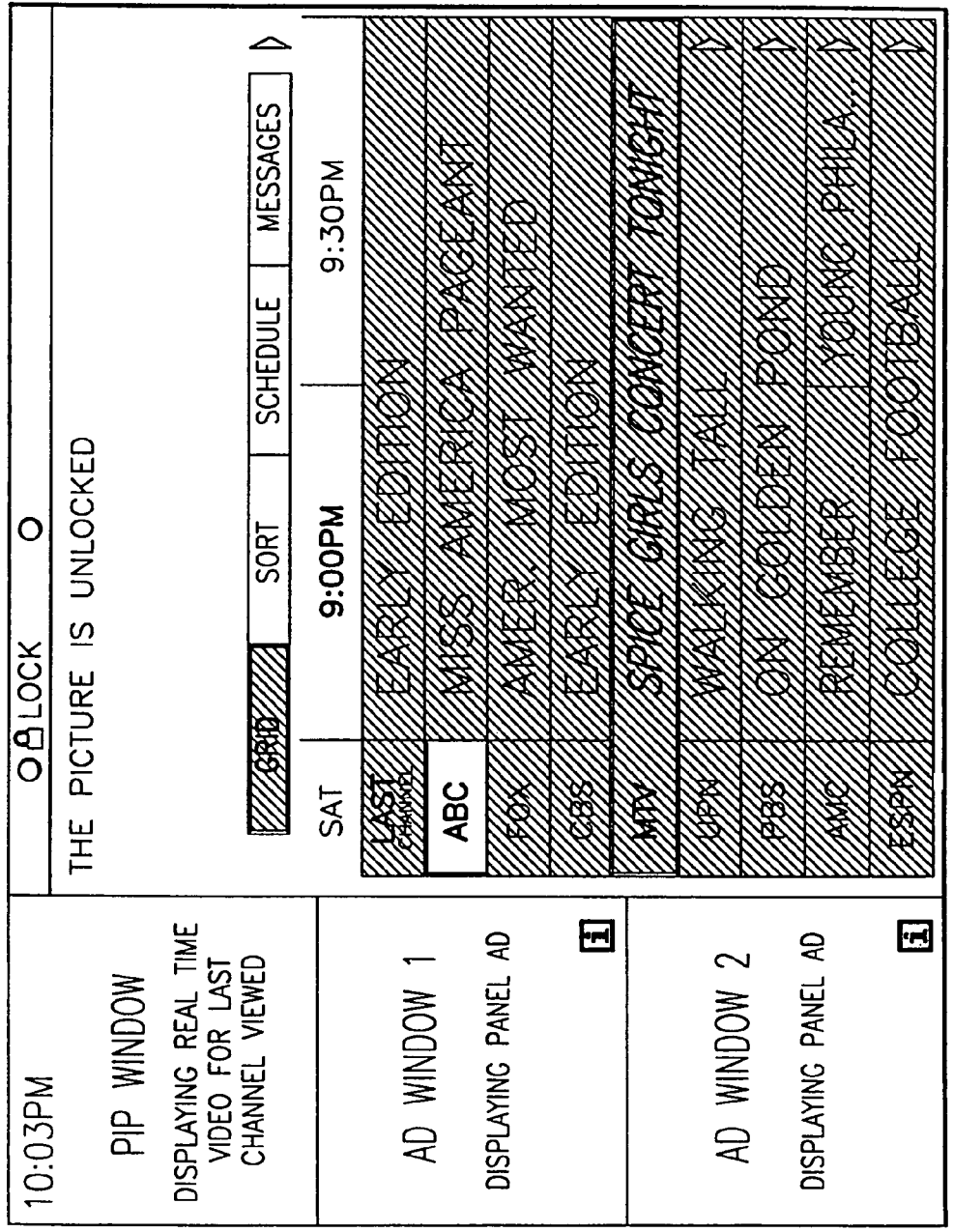
FIGS. 4a and 4b is a graphic representation of a sample on screen EPG display depicting the EPG's on-screen Grid Guide in the channel-scrolling.
Figure 4B:
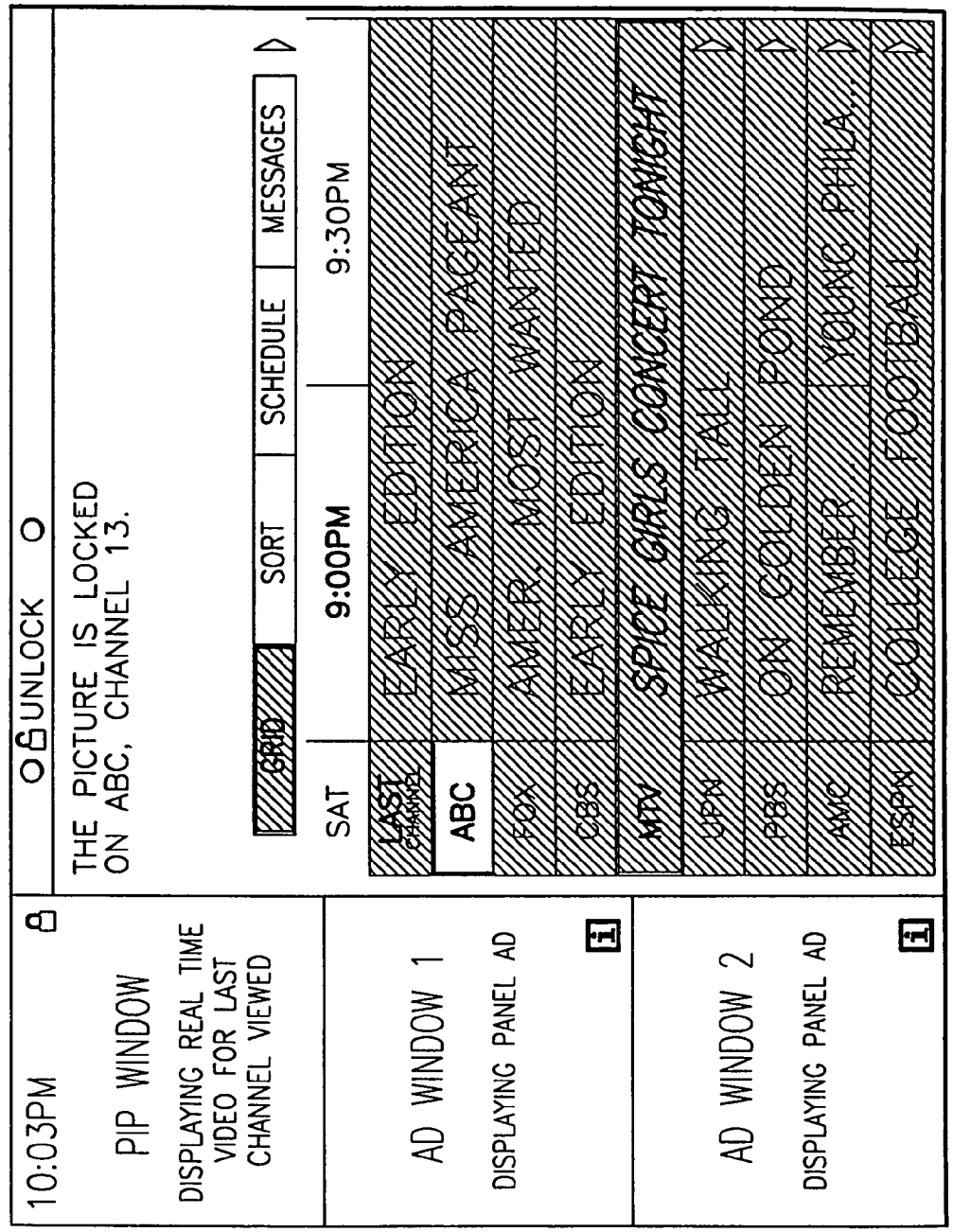
Figure 6:
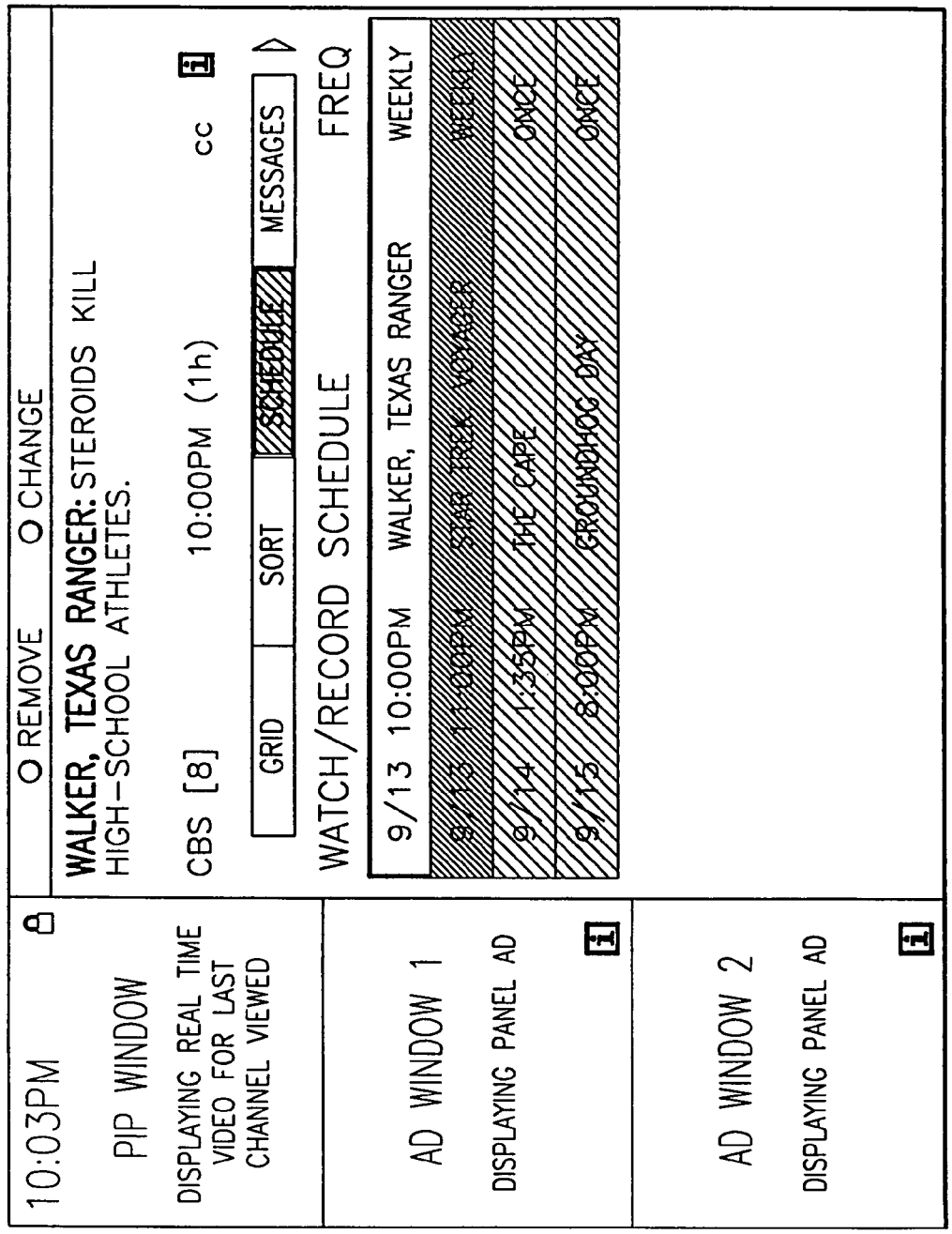
FIG. 6 is a graphic representation of a sample on screen EPG display depicting the Watch/Record Schedule screen of the EPG.

For instance, in one embodiment, as illustrated in FIGS. 3, 4a and b, 5, and 6, the EPG displays two buttons at the top of each of the four screens pictured. In each of the four different screens, the top left button has a different function. (As referred to in this application, the directions "left" and "right" refer to the viewer's left and the viewer's right, respectively.) FIG. 3 depicts the EPG's on-screen Grid Guide in the programming scrolling mode. In FIG. 3, the viewer's-left button is described as "Watch." FIGS. 4a and 4b depict the EPG's on-screen Grid Guide in the channel-scrolling. In FIGS. 4a and b, the viewer's-left button is a toggle button, alternately described as "Lock" and "Unlock." FIG. 5 depicts the EPG in the Watch Scheduling Function. In FIG. 5, the viewer's-left button is described as "Cancel." FIG. 6 depicts the Watch/Record Schedule screen of the EPG. In FIG. 6, the viewer's-left button is described as "Remove."

4. Watch Scheduling.

The EPG provides the viewer with the opportunity to select program titles, scheduled for delivery at future times, to watch. By selecting program titles, the viewer builds a "watch list." Watch list options and instructions provide functionality parallel to the EPG's Record Function. Instead of automatically recording the programs selected, the Watch Function automatically turns the television on, if it is not already on, and automatically tunes the television to the channel scheduled to deliver the designated program, if the television is not already tuned to that channel. This feature provides the viewer with the opportunity to watch a program of special interest at the scheduled time even if the viewer has forgotten about the scheduled delivery. This feature will also provide for parental selection of program viewing for children.

The viewer can enter the Watch Scheduling Function in a number of ways. The viewer can enter the Watch Scheduling Function by selecting that Function from the EPG menu. The viewer can also enter the Watch Scheduling Function by highlighting an Ad Window displaying an advertisement for a future-scheduled program or a Virtual Channel Ad Slot displaying an advertisement for a future-scheduled program (both of which are described elsewhere in this application).

The viewer can designate any program on the Watch List as a program that the viewer wants to watch regularly. In one embodiment, if the viewer enters the Watch Scheduling Function by highlighting an Ad Window or Virtual Channel Ad Slot, then if the viewer chooses to designate the program as a "regular" watch, the designation expires after a certain amount of time if the advertiser stops running the advertisement. The planned expiration is an incentive to the advertisers to renew their advertisements.

5. "All Channel" Guide Format, Channel Guide Format and "Next"/"Previous" Channel Guide.

The viewer can choose to view the Grid Guide in an "all channel" format which displays in some order every channel and the listings of programs already in progress or scheduled to begin at some time in the future. In the "all channel" format, the viewer scrolls up and down the listings for each channel and from left to right and right to left to view the listings for a channel scheduled for different times during the day. Typically, the left-most portion of the guide begins with the earliest scheduled programs and continues to the right serially through the listings scheduled at later times during the day.

As an alternative, the viewer can choose to view the programs scheduled for one channel at a time (a "Channel Guide"). In this format, the viewer scrolls up and down the listings for a single channel as scheduled for different times of the day. Typically, the "top" of the Channel Guide begins with the earliest scheduled program and continues serially through the listings scheduled at later times during the day. FIG. 9 is a graphic representation of a sample on screen EPG display depicting the Channel Guide function of the EPG.

In the "Channel Guide" format, the viewer can select to view the Channel Guide for the "next" channel or for the "previous" channel. In one embodiment, the "Next" and "Previous" Channel Guide is an option on one of the EPG menus, action buttons or task bars. In another embodiment, the viewer's remote control device provides "Next" and "Previous" Channel Guide keys. In another embodiment, the viewer uses the up and down arrow keys to navigate to the next or previous Channel Guides.

B. Improved Viewer Control of Video Recording of Future-Scheduled Programming

1. Recording Program Displayed in PIP Window.

As explained in more detail below, the EPG provides for multiple "windows." One window displays the currently tuned program. When the viewer enters the EPG from the television mode, the PIP window is "highlighted." In one embodiment, highlighting of the PIP window is accomplished by a color change of the border around the PIP window. While the PIP window is highlighted, the viewer can instruct the EPG to record the displayed program. In one embodiment, the viewer records the displayed program in the highlighted PIP window by pressing the record button on the viewer's remote control device.

2. Recording "Regularly."

One embodiment of the present invention provides the viewer with the option of recording a particular program "regularly." The "regularly" option can be selected when the viewer highlights a particular program title on the EPG Grid Guide. Viewer selection of the "regularly" option instructs the VCR control system to record the particular title on the selected channel at the selected time slot any day of the week that the program is telecast. If a telecast of the selected title is preempted by another program, the new program is not recorded. The change in the telecast schedule is determined by comparing the title of the selected program to the title of the program actually telecast. In one embodiment of the invention, it is assumed that the title of the program actually telecast is carried in the vertical blanking interval of the television signal. When the viewer has instructed the EPG to "regularly" record a particular program, if the selected program is preempted by another program, the preempting program is not recorded and the EPG displays a message notifying the viewer that the selected program was preempted and was not recorded.

3. Record Function Rerun Filter for "Regularly" Recorded Programs.

The EPG is capable of detecting reruns. The identification of the program as a rerun may be carried in the VBI of the program broadcast. In another embodiment, the rerun identification information is available in the program detail. In one embodiment of the Record Function, when the viewer selects the "Regularly" record option, the viewer is also given the option of filtering reruns. If the viewer selects the rerun filter option, then every time the program is regularly scheduled, the EPG determines whether or not the program episode to be delivered is identified as a rerun. If the episode is a rerun, and if the viewer has selected the rerun filter option for that program title, then the EPG will not record the episode.

4. Skip Recording Instruction.

In the EPG's Record Function, the viewer selects a program title for recording. Once a program title has been selected, the viewer is asked to select a record-scheduling option. The viewer can select Once, Daily, Weekly, or Regularly as a record-scheduling option. If the viewer has selected a record-scheduling option of Daily, Weekly, or Regularly, one embodiment allows the viewer to skip recording of the program one time. The One-time skip instruction would result in the EPG not recording the program title, even though the record instruction for that program title remained in the record list.

In the EPG's Record Function, the viewer can turn select the skip instruction for all programs on the Record List, or for selected programs on the Record List. This feature might be used when the viewer goes on vacation. The programs remain on the Record List. At the viewer's option, the viewer can turn off the skip instruction for all programs on the Record List, or for selected programs on the Record List.

5. Automatic Record List Update.

In the EPG's Record Function, the EPG will detect changes in program scheduling as compared to record instructions for particular program titles designated for recording. In one embodiment, when the EPG detects program scheduling changes, the Record List is automatically updated with the schedule change information. For instance, if a sports event runs longer than the originally scheduled time, a packet of scheduling update information can be transmitted over the VBI that updates the time of the programs scheduled to be telecast after the sports event. The EPG detects the VBI scheduling updates and updates the recording list to permit the recording of any programs following the sports program to be recorded as appropriate.

6. Recording on Recordable Digital Video Discs.

The viewer can instruct the EPG to record programs on recordable Digital Video Discs (DVD's). Because of the extended storage capacity of DVD's, the viewer can instruct the EPG to record and index an extended period of programming. For instance, the viewer can instruct the EPG to record and index, e.g., 4 hours of CNN news broadcasts certain number. When the viewer is ready to view the DVD recording, the EPG displays the DVD index on screen. The viewer can then select to view either the entire DVD, or only those portions of the recording in which the viewer is interested.

In one embodiment, program-level indexing of recorded programs is created. In another embodiment, intra-program indexing is created by using information transmitted in the VBI of the video transmitted. In this embodiment, a recording of CNN would likely show indexing breakdowns that include themes, such as "International News," "National News," "Sports," "Entertainment," "Business & Finance," and "Weather."

In yet another embodiment, intra-program indexing is created using some constant time interval. The index shows a start and end time interval, and audio content excerpts.

In still another embodiment, indexing software analyzes the audio content of the program recorded ("Content Analysis Program"). This is typically in addition to using all indexing breakdown information transmitted in the VBI of the program. The Content Analysis Program uses speech and voice recognition technology to analyze, among other things, such variables as: changes in announcers, changes in tone, changes in speed, topical words, geographic locations, substantive words. The Content Analysis Program then creates a topical index in addition to the theme index described above.

7. Speed Sensitive Tape Capacity.

The EPG's Record Function provides a Record List that identifies the titles of programs that the viewer has selected to be recorded. The speed sensitive tape capacity feature uses color coding to identify in one color the titles that would fit on one tape at a fast tape speed and to separately identify, with another color, the titles that would fit on one tape at slow tape speed.

8. Record Instruction Conflict Resolution.

The EPG's Record Function recognizes conflicts in viewer record instructions. In one embodiment, the EPG's Record Function prompts the viewer to resolve the conflict. For instance, in the Record Function, the EPG would accept viewer instructions to record a particular program. The EPG compares the newly received record instruction to as-yet incompletely executed, or as yet unexecuted, record instructions in the Record List. If the EPG detects an overlap in date, time and duration between the newly received instruction on the one hand and one or more of the remaining record instructions in the Record List, the EPG formats a message to the viewer describing the conflict. The message describes to the user the newly received instruction to record a particular program and the conflicting record instructions in the Record List. In Record Function, the EPG will prevent entry of conflicting instructions into the Record List. The EPG will require that the viewer revise the record instructions to eliminate the conflict. In one embodiment, if the EPG detects that one recording instruction pertains to a "one occurrence" program that conflicts in date, time and duration with a recording instruction to record a "regularly recorded" program, the EPG would format an on screen message that would suggest to the viewer that the viewer select the "one occurrence" program to be recorded. In another embodiment, the EPG automatically "decides" to override the "regularly record" instruction and will record the "one occurrence" program with no further intervention by the viewer.

One way to resolve a recording instruction conflict is to chose an alternative occurrence of the conflicting program for recording. In one embodiment of the EPG, the viewer can highlight a particular program in the EPG and request a list of all occurrences of that program for the week. The viewer can then instruct the EPG to record an alternative occurrence of the program. In an alternative embodiment, the viewer can view an alphabetical list of all programs for the week. The viewer can mark a program for viewing or recording from the alphabetical list.

9. Recording from Theme Guides.

The EPG provides various Theme Guides, e.g., sports, movies, news, etc. When the viewer selects a particular Theme Guide, e.g., the Sports Theme Guide, the viewer can instruct the EPG to record an event while in the Theme Guide without having to exit the Theme Guide and go to the program Grid Guide. For instance, in the Sports Theme Guide, the viewer instructs the EPG to add a sports event to the Record List by clicking on the box score for a particular sports event and/or on the sports program listing in the Sports Theme Guide.

C. Improved Features to the EPG Display and Navigation

1. E-mail.

In the preferred embodiment, the EPG interfaces with the Internet/World Wide Web. In the preferred embodiment, the viewer can access the Internet to send and receive e-mail.

In another embodiment, the television terminal is separately addressable, and the head end controls e-mail traffic between viewers on its network. To facilitate two-way transmission a 900 or toll free number is used as a back link. E-mail can then be sent to the appropriate viewer through the VBI to the viewer's separately addressable television.

2. Multiple Viewable "Windows."

The EPG UI screen provides for multiple viewable "windows." One window presents the EPG Grid Guide. Another window presents the picture-in-picture (PIP) window on which the currently tuned program is displayed. Another window displays advertising information (the "Ad Window"). Advertising may be in the form of graphics and textual information. Alternatively, advertising may be in the form of video display. In one embodiment, the Ad Windows are interactive.

As the viewer enters the EPG from the television mode, the PIP window is highlighted. The viewer can lock the PIP window. Locking the PIP window allows the viewer to continue to watch the television program being displayed in the PIP window while the viewer scrolls through the EPG program Grid Guide. Unlocking the PIP window causes the video for the program title highlighted in the Grid Guide to be displayed in the PIP window.

As described further below, the viewer can also highlight the Ad Window. Doing so will cause additional text describing the product to be displayed in the detail box are of the EPG Grid Guide.

If the Ad Window displays information about a particular product, pressing a record button will instruct the EPG to record an infomercial, to the extent that one is scheduled for a future time. Alternatively, the Ad Window can display information about a future-scheduled television program or about a series of programs to be telecast over a period of time. In that case, pressing a record button will instruct the EPG to record the future-scheduled program. Alternatively, the viewer can designate the program for the Watch List.

In one embodiment, the viewer navigates from the Grid Guide to the PIP Window by pressing the left arrow key until the cursor/highlighting reaches the PIP Window. From the PIP Window, the viewer uses the right arrow key to move back to the Grid Guide. In one embodiment, moving from the PIP Window to the Grid Guide causes the cursor to scroll to the very top of the Grid Guide lineup. From the top of the Grid Guide lineup, pressing the up arrow key moves the cursor to the navigation bar. The EPG provides several possible destinations on the navigation bar, e.g., info center, sports, news, set up, help, etc.

From the PIP Window, pressing the down arrow key moves the cursor to the Ad Window.

The viewer can set a default, or allow the system default, to highlight a particular navigation bar destination when the viewer initially enters the Grid Guide.

In another embodiment of this invention, the position and size of the windows and other user interface features are customizable by the viewer. This feature is similar to the PC user's ability under a Microsoft Windows operating system to control the size and position of various functional windows. The difference here is that, in contrast to, e.g., a Windows 95 operating system which allows the PC user to control the size and position of various functional windows on the face of a static PC monitor background, the present invention allows the television viewer to manipulate the PIP Window carrying a video signal of a first television channel tuned by a first television tuner and the various EPG Windows and EPG features on the face of the television monitor, while the television monitor continues to receive a second video signal of a second television channel tuned by a second television tuner.

3. Translucency On-Screen Effects.

In one embodiment, the EPG creates special translucency visual effects. To create the translucency effect, the system alternates the display format pixel by pixel—one pixel is the color of the overlay and the next pixel is transparent.

4. On-Screen Notifications.

The EPG formats on-screen notifications to the viewer and displays the notification to the viewer. On-screen notifications can be used to alert the viewer to any number of possible items of information. For instance, the EPG can notify the viewer that the EPG will begin recording a particular program within a certain amount of time, e.g., 2 minutes. The record notification could further ask the viewer whether to switch the cable box to record the program. If the viewer indicated that the viewer did not want the EPG to switch to the cable box to record the program, then the EPG would delete the program from the record list. Another example would be to notify the viewer that a program that may be of interest (e.g., as determined from analyzing the Viewer's Profile) will be broadcast on another channel within a certain amount of time, e.g., 2 minutes. The EPG could then ask if the viewer wants to view the program on the other channel. If the viewer indicates that the viewer wants to watch the program on the other channel, then the EPG will automatically tune to the other channel at the appropriate time. Alternatively, the EPG could ask the viewer is the viewer wants to record the program on the other channel and could then record that program at the appropriate time if the viewer answers affirmatively.

If the television is in television mode, the notification will be displayed on-screen. The notification can be displayed in a number of ways, including: 1.) a complete screen overlay; 2.) a partial screen overlay; 3.) The real time program video is automatically changed to a PIP format, and the notification is displayed outside of the PIP window; 4.) The real time program video is automatically changed to a PIP format, and the notification is displayed inside of the PIP window; 5.) as a "watermark" somewhere on-screen; 6.) an on-screen icon is displayed which can be "pressed" by the viewer using the navigation keys on the viewer's remote control device, and which, if pressed, displays the notification in one of the above formats; 7.) the program video is compressed slightly to fit in some percentage, e.g., 90%, of the top of the screen, and the notification is displayed as a horizontally-rolling message at the bottom of the screen; 8.) the program video is compressed slightly to fit in some percentage, e.g., 90%, of the bottom of the screen, and the notification is displayed as a horizontally-rolling message at the top of the screen.

If the television is in some mode other than the television mode, the EPG can notify the viewer through some modification of one of the above-described formats. For instance, if the television is in the Grid Guide mode in a PIP format, then the EPG could use any of format numbers 1.), 2.), 5.), 6.), 7.), 8.) or, the EPG could notify the viewer by displaying the notification in the Ad Window, a virtual ad channel slot, in the detail information window, or in a horizontally-rolling message at the top or bottom of the screen.

5. Theme Navigation Bar.

The theme display is above the top of the Grid Guide. In one embodiment, the Grid Guide display provides for a "page up" on-screen button. In one embodiment, the Grid Guide display also provides for a "menu" button. The viewer can scroll to the top of the Grid Guide by successively "pressing" the page up on-screen button, or by "pressing" the menu button.

6. Improved Scrolling Through the EPG and Smooth Scrolling.

In the top level screen of the EPG in Grid Guide mode, the viewer user can jump directly to a future day of programming schedule information.

In one embodiment, the Grid Guide display provides for a "page up" on-screen button.

Program schedule information for a plurality of channels is displayed on a screen of the EPG in Grid Guide mode. Titles are shortened for display in the Grid Guide to conserve space. The entire title is available to the system and is displayed in the detailed description area of the Grid Guide when the viewer highlights a tile in the Grid Guide for the corresponding program listing. But the EPG shortens the titles, according to a set of rules for shortening the titles, so that the titles fit in the scheduling tiles of the Grid Guide.

The viewer can scroll up or down through the program listings. While scrolling, the titles are not drawn until the scrolling stops. Such a delay in drawing titles speeds up the processing and makes the screen appearance less confusing. While scrolling, the cursor will not highlight the top or the bottom tile on the screen unless the channel is the top or bottom of the lineup. The absence of highlighting signals to the viewer that more channels remain in the scrolled direction.

A further improvement to the EPG User Interface ("UI") is the development of "Smooth Scrolling." When the cursor reaches the second tile from the bottom, and a new tile appears on the bottom, the entire tile and its contents, e.g., a program title, grow gradually in height until the newly appearing tile reaches full tile height. At the same time, the tile that is disappearing from the top of the screen, and the contents of that top tile, shrink in height until the tile is gone. This provides a smooth transition in the overall screen display but is not actually perceptible because it is changing at $\frac{1}{60}$ of a sec.

Smooth Scrolling is less disorienting to the viewer than a page by page screen change, which is the scrolling technique used in existing on screen guides. The entire bit map does not need to be redrawn as you scroll up one tile—only the top tile is shrunk or compressed in the vertical dimension.

In one embodiment, while slowly scrolling, the new title appearing on the screen is not redrawn until the scrolling stops. While rapidly scrolling multiple tiles, the processor stops redrawing the title on any of the tiles during the scroll; the processor waits until the scroll stops or slows down to redraw the titles. This permits faster scrolling because the titles do not have to be retrieved until the screen reaches the desired point. Redrawing the data is very processor intensive. A special interaction between the firmware and the hardware is required to minimize redrawing the bit map and retrieving data from memory. This applies to both vertical and horizontal scrolling. The user can remain oriented because the channel identifiers and schedule times remain displayed.

7. "Jumping" in the EPG.

The viewer can "jump" to the desired action or location in the EPG in a number of ways. In the Grid Guide, the viewer can jump to the channel slot for a particular channel by entering the digits of the channel identification number on the key pad of the viewer's remote control device. The EPG interprets the number and calculates the proper position for the EPG cursor. The EPG then displays the cursor at the appropriate channel slot on-screen.

In one embodiment, the viewer's favorite and/or most watched channels are displayed as buttons on a favorite channel selection bar somewhere on the EPG display of the Grid Guide. The viewer can jump to one of the viewer's favorite channels by "pressing" the appropriate channel button.

In another embodiment, the viewer's remote control device displays letters associated with the numbers on the key pad. The viewer can use a special "Alt" key to allow the viewer to press the keys as if alphabetic and/or alphanumeric. In this way, the viewer can enter a channel identifier, such as "CNN".

In yet another embodiment, the viewer can request a pull down menu of favorite channel identifiers and can select a channel from the pull down menu.

In yet another embodiment, the viewer can set "bookmarks" in the EPG by using a "bookmark" key on the viewer's remote control device, or alternatively, a "bookmark" button on the EPG display. The viewer can press the "bookmark" key when the user wants to mark a current location for later return. The viewer can then scroll, jump, or otherwise navigate away to some other location in the EPG. When the viewer wants to return to the book marked location, the viewer can press the "lastmark" key (on either the viewer's remote control device, or alternatively on the EPG display). The EPG can record a plurality of book marked locations. In one embodiment, the EPG can remember book marked locations after the viewer turns off the television and then turns on the television multiple times.

8. Thematic Color-Coding of Program Schedule.

The EPG categorizes programs according to a plurality of themes. In one embodiment, the EPG color codes the presentation of the program in the Grid Guide according to the theme categorization assigned to the program.

9. Controllable Number of Days of Programming.

Typically, the EPG will carry only 2 days of program listings. At the viewer's selection, the EPG can carry only a single day of program listings. The single day option provides a smaller range of program listings but increases response time. Alternatively, the viewer can select to carry any number of days of program listings, up to the number of days that is provided for by the particular installation, which is set by the corresponding amount of memory storage available.

D. Parental Control of the EPG Display

The Parent viewer initially enters the Parental Control Function during initial EPG setup procedures. In the EPG setup procedure, the Parent identifies all viewers of the television, and assigns individual viewer Identifiers. The Parent viewer also establishes a password for said Parent viewer. U.S. Provisional Patent Application Ser. No. 60/085,401 ("V-CHIP Plus+: In-Guide User Interface Apparatus and Method for Programmable Blocking of Television and other viewable programming such as for Parental Control of a Television Receiver") describes Parental Control setup procedures for the identification of individual viewers and initialization of password protection, the disclosure of which is incorporated by reference here as if fully stated herein.

In the Parental Control Function, the Parent selects the channels and programs that can be visible in the Grid Guide for a particular viewer and selects channels and/or programs that are to be blocked from viewing. Child viewers, as identified during setup procedure, will view a simplified Grid Guide and will be blocked from viewing the programs so marked by the Parent. In one embodiment, individual viewers are identified by viewer ID and password. In another embodiment, individual viewers have different remote control devices, the use of which is also password protected.

E. Improved Television Program Information Access by the Viewer

1. Virtual Channel Ad Slots and Ad Window Program Advertisements.

As described below, the EPG provides the viewer with multiple opportunities to obtain detailed information about television programs. As is further described below, the EPG provides the viewer the opportunity to select Virtual Channel Ad Slots or Ad Window displays that advertise future-scheduled television programs and get additional information in the way of text or video clips.

2. Additional Detailed Information for Viewer Access Including Link to the Internet.

The EPG displays detailed information relevant to program listings in the detailed information area of the Grid Guide. The detailed information can include, among other things, a detailed textual description of the program, information about the actors and actresses, information about the production of the program, product related information, identification of relevant Internet web sites and online Internet chat rooms. The EPG provides the viewer with the ability to request detailed information from such guides/data services in a number of ways, including when the viewer highlights: a particular program in the Grid Guide, the Ad Window, or a Virtual Channel Ad Slot. In one embodiment, the viewer's remote control device has a power "Information" key. When the viewer has navigated the on screen highlighting/cursor to a particular tile or window on the EPG on screen display, the viewer can press the remote control device "Information" key to request the additional information In one embodiment, when the viewer highlights a particular program in the Grid Guide, the Ad Window, or a Virtual Channel Ad Slot, or other requests access to detailed program-related information, the EPG connects the viewer with an external database of information, such as with a particular web site on the Internet. The viewer can instruct the EPG to connect the user with detailed specialized information guides/data services, such as sports, news, or other guides/ data services. In one embodiment, the linking to the external data source is accomplished by storing a web site address with the Ad Window or Virtual Channel Ad Slot advertisement in the RAM of the user terminal.

A sports program listed in the Grid Guide provides an illuminating example of how the viewer interacts with such a detailed specialized information guide/data service. When the viewer highlights a football game listed in the Grid Guide, the normal detail concerning the program is displayed in the detailed information are of the Grid Guide. Furthermore, multiple icons related to the highlighted program can be displayed in the Grid Guide. One icon alerts the user that the game is already underway. Another icon indicates the availability of specialized guide information. The viewer can select the program from the Grid Guide for viewing and/or recording. In addition, the viewer can select the specialized guide icon. In the case of a sports program, selecting the specialized guide icon would display, for instance, a scoreboard for the game if the game were already in progress in the detailed information area of the Grid Guide. If the game were scheduled for a future time, then selecting the specialized guide icon would display, for instance, information about the players, the teams, and perhaps, the odds about the game.

Another icon, displayed for instance in the display of the sports guide scoreboard, provides the viewer with the option of connecting to the Internet, e.g., to a particular web site that provides additional information about the game, possibly, including online chat about the game. In one embodiment, the EPG switches to full screen to display of the Internet web site. In another embodiment, the EPG displays the Internet web site in the area of the screen previously occupied by the Grid Guide and/or the Grid Guide and the Ad Window, while continuing to display the real time video display of the currently tuned television program in the PIP window. Alternatively, the EPG can display the Internet web site in the PIP window and display the currently tuned television program in the area of the screen previously occupied by the Grid Guide and/or the Grid Guide and the Ad Window. The Internet web site to which the EPG initially connects (the "contact web site") may be a specialized directory, using pre-determined hyperlinks to the viewer to other cites of interest. The contact web site may additionally, or in the alternative, offer search capabilities to the viewer to locate information of interest.

Once the viewer is connected with a specialized information guide/data service, the viewer can use the guide/data service to direct the viewer to particular information contained in the EPG Grid Guide. For instance, a viewer selects a news program to watch. While watching the news program, the news broadcaster describes an event involving astronauts. The viewer selects the news guide/data service icon and connects to a web site on the Internet describing, among other things, additional information about the particular event involving the astronauts. The viewer uses the search engine offered by the contact web site to locate additional information about the same astronauts. At the subsequent web sites, a Discovery Channel program is mentioned concerning some of the same astronauts. The viewer instructs the EPG to locate any occurrence of the referenced program and to schedule that program to be recorded. In one embodiment, a PLUS CODE-like address is used to link to, or record, the scheduled program.

The viewer can search an index, available on the Internet and created by a news data service, of recorded television news programs and reports. The viewer can search the index. If the viewer selects one of the indexed reports, a video clip of the indexed report will be shown in the area on the screen occupied by the Internet web site display, or any alternate area or portion of the on-screen display. The viewer can instruct the EPG to record the video clip.

The EPG is capable of integrating additional information provided by the special data services into the EPG display. For instance, in the case of a sports data service, the EPG can format the program listing display and/or the sports scores for a game with special color coding depending upon the stage of the game. For instance, if the game is in progress, the EPG will format the program listing and/or the sports scores for that game with one color, e.g., green; if the game is completed, the program listing and/or the final scores can be in a different color, e.g., blue. If the game is in progress, the viewer can highlight and select the box score to move from the box score to the game shown on the television. In one embodiment, the selected television sports program appears in the PIP Window or the Ad Window, allowing the viewer to read the sports program-related story in the sports guide while watching the corresponding television sports program.

The EPG is further-capable of linking between news items in a special news guide and related television programs. The viewer can link to a news program to watch or record that program by highlighting and selecting a news item in a news guide. In one embodiment, the selected television news program appears in the PIP Window or the Ad Window, allowing the viewer to read the story in the news guide while watching a tv news program that reports on the event.

In one embodiment, the VBI for selected channels are dedicated to the delivery of a special data service. For instance, the ESPN VBI would carry the sports data service only. In one embodiment, as an incentive to carry this data, the data service would display the ESPN TV program in the PIP window. Since the tuner must be set to ESPN to capture the data, the television signal is available for display in the PIP.

F. Improved Opportunities for the Commercial Advertiser to Reach the Viewer

1. Ad Window Product-Related Video Clips and Infomercial Recording

The EPG provides producers of infomercials with extended capabilities to reach the viewers through the Ad Window. Because of the cost of buying advertising time, a growing number of product manufacturers and marketers produce infomercials about their products and then buy relatively inexpensive air time for their infomercials according to off-prime-time schedules, often on non-prime channels. The EPG provides the producers of infomercials with the opportunity to provide the viewer with the opportunity to record an infomercial that is broadcast at a time, or on a channel, that would be inconvenient for the viewer to watch real-time.

If the Ad Window displays information about a particular product, pressing a record button will instruct the EPG to record an infomercial or advertisement, to the extent that one is scheduled for a future time. Alternatively, the viewer can designate the infomercial or advertisement for the Watch List. Alternatively, the EPG provides the producers of infomercials with the opportunity to provide the viewer with the opportunity to view a video clip about the product being advertised.

In one embodiment, the video clip associated with the product and/or program displayed in the Ad Window is shown when the viewer highlights the Ad Window. Depending upon the embodiment and/or viewer option selections, the video clip is shown in the PIP window, in the Ad Window, or full screen. At the conclusion of the video clip, the EPG typically returns to the mode in which the viewer was operating immediately before selecting the option that triggered the display of the video clip.

2. Ad Window Program-Related Recording

The EPG provides distributors of television programming with additional opportunities to reach the viewer. The Ad Window can display information about a future-scheduled television program. If the viewer is interested in recording the program, the viewer can take a number of alternative actions. For instance, in one embodiment, the viewer can instruct the EPG to record the future-scheduled program. In one embodiment, the viewer presses record button on the remote control device to instruct the EPG to record the future-scheduled program. Alternatively, the viewer can instruct the EPG to add program to the Watch List. Alternatively, the viewer can instruct the EPG to display a video clip about the program. Yet further, the viewer can instruct the EPG to connect the user with detailed specialized information guides/data services, such as sports, news, or other guides/data services. The EPG provides the viewer with the ability to request detailed information from such guides/data services in a number of ways, including when the viewer highlights: a particular program in the Grid Guide, the Ad Window, or a Virtual Channel Ad Slot. In one embodiment, the EPG displays relevant detailed information in the detailed information area of the Grid Guide. In another embodiment, the EPG connects the viewer with an external database of information, such as with a particular web site on the Internet.

3. Panel Ads.

In one embodiment, Panel ads occupy a fixed area in the Guide and are generally filled with paid advertisements. Located directly below the PIP in an Ad Window, space is available in the Guide for two Panel ads. Each Panel ad occupies approximately ⅛th of the total screen area. The usable area of a Panel ad is 132 pixels high×160 pixels wide, with 2 pixel wide black borders all around and 2 pixels of gray on the left and right sides and between the two ad spaces. When a given ad space is not sold, the space will be filled with a Placeholder ad, stored in ROM, and inserted in the available space, or with a bonus ad.

An advertiser may purchase both ⅛th screen areas, thus creating a single ad with a usable space of 270 pixels high by 160 pixels wide, with 2 pixel wide black borders all around and 2 pixels wide of gray on the left and right sides.

In one embodiment, all Guide screens are made up of "hard pages." A hard page is defined as an area comprising 9 channel slots. Each time a user scrolls below the 9*x channel slot, a new "hard page" appears. Scrolling back up will bring the previous hard page back into view. Each hard page may have different Panel ads associated with it.

In one embodiment, Hard pages are defined differently in the Sort screens. Each sort category (e.g. Movies, Sports, Children's) will be considered one hard page regardless of the number of items in the list vertically. As the user moves Panel ad Pair 2 with channels 9-16 and the second Channel ad Panel ad Pair 3 with channels 17-20 and the third and fourth Channel ads If the user turned on more channels requiring the addition of a fourth hard page, then the fourth Panel ad Pair would become visible.

Figure 10A:
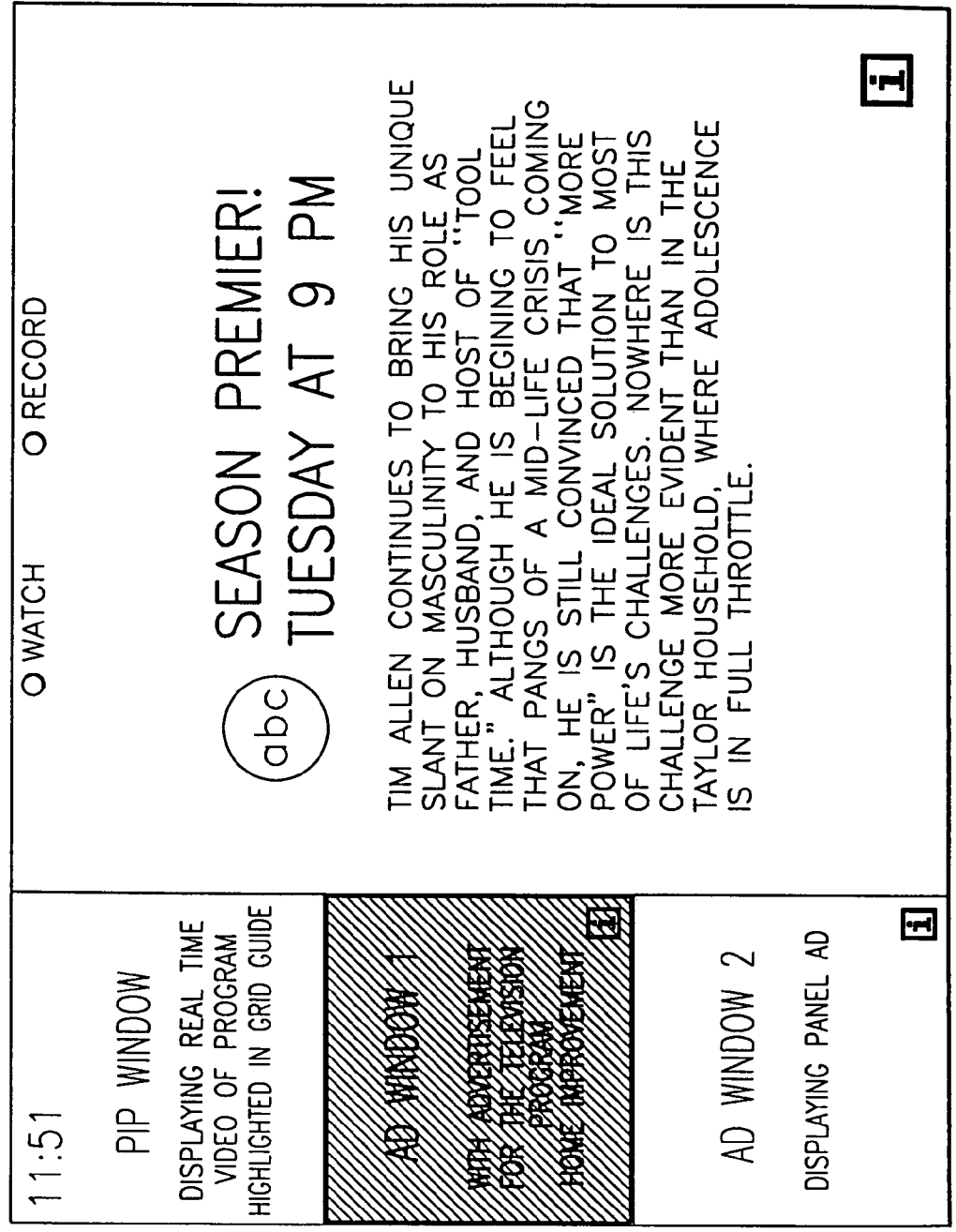

In one embodiment, the user can highlight these ads, resulting in the automatic display of an expanded information box. This expanded information box covers the entire right-hand ⅔rds of the grid. The user closes the expanded information box by moving the highlight off the Panel ad or by pressing the information button after the last related information box screen has been presented. FIGS. 10a and 10b are graphic representations of sample on screen EPG displays depicting one embodiment of the feature of presenting additional information concerning the subject matter of a highlighted Panel Ad Window.

In one embodiment, Panel ads are surrounded by flat black borders. When a panel ad is highlighted, the border turns yellow. When a program is set to record the border turns red (dark red when the Panel ad is not highlighted, light/bright red when highlighted). When a program is scheduled to watch, the border turns orange (dark orange when the Panel ad is not highlighted, light/bright orange when highlighted).

In one embodiment, there can be multiple information "screens" displayed sequentially in the expanded information box. Pressing the Info. button while an ad is highlighted accesses these additional screens. There is no finite limit to the number of additional screens; memory limitations and selling requirements will limit this number.

In one embodiment, if a Panel ad is highlighted, has show information associated with it, and the advertised show is currently on, the user may tune directly to the related program by pressing the Left Action button (the Blue button which is labeled "Watch") or by pressing the Enter/Select button on the remote. Pressing the Watch button also places the show in the Record/Watch Schedule for the duration of the show to allow the user to set the frequency to daily or weekly. If the show is not currently on, pressing the Left Action button places the show in the Record/Watch Schedule or; pressing the Enter/Select button tunes to the channel related to the show in the ad. Shows added to the Record/Watch Schedule may be set to be viewed: once, daily, or weekly. The Watch feature and related Action button labels operate in the same way as if scheduling a show to watch from the Grid.

In one embodiment, if a Panel ad has show information associated with it, the show may be recorded by highlighting the ad and pressing the Right Action button (the Green button, labeled "Record"). If the show is on now, recording begins immediately and the show is placed in the Record/Watch Schedule for the duration of the show to allow the user to set the frequency to daily or weekly. If the show is on in the future, that show is added to the Record/Watch Schedule for auto-recording. Shows added to the Record/Watch Schedule may be set to be recorded: once, daily, or weekly. The Record feature and related Action button labels operate in the same way as if scheduling a show to record from the Grid.

In one embodiment, Panel ads can be dynamic. There are two areas which may be dynamic: 1.) the Panel ad space; and/or 2.) the Information box.

The Panel ad area may change over time, e.g., every x seconds rotating through a plurality of different graphical or textual ad executions in the Panel ad space. When a Panel ad is highlighted, the ad rotation stops on the currently displayed ad visual. The dynamic rotation does not restart until the Panel ad is de-highlighted.

The information box text associated with the Panel ad may change over time, e.g., every y seconds, rotating through a plurality of different screens of text. The screen rotation stops if the user presses the Info. Button, displaying the first page of info. text. This option is available for advertisers to rotate different headlines in the information box. The user may view subsequent pages by pressing the Info. button again. The screen rotation does not restart until after the Panel ad is de-highlighted.

4. Virtual Channel Ad Slots.

The EPG provides producers of infomercials with extended capabilities to reach the viewers through Virtual Channel Ad Slots, also referred to as Channel ads. Virtual Channel Ad Slots appear as rows of the Grid Guide and typically show the titles of the programs that are scheduled for a particular channel. The EPG Grid Guide's Virtual Channel Ad Slots provide advertisement to be displayed as a row in the Grid Guides schedule of programs. The Virtual Channel Ad Slots may be used to provide multiple exposures of a particular program in the guide. The Virtual Channel Ad Slots act like a channel entry in the Grid Guide in that the viewer can record, watch, schedule for watching, and/or get information about the advertised program in the information detail box of the Grid Guide.

In FIG. 1 of the drawing, tile 52 shows an example of a Virtual Channel Ad Slot for an ad for a television program—it is a program listing that is out of place channel-wise and time-wise in the Grid Guide 22. That is, it does not appear in the usual channel position or time position in the guide, but the tile is otherwise like the other program listing tiles of grid guide 22 (including height), except that it occupies the entire width of the tile irrespective of the duration of the program. A tile for a normal program listing scrolls off the screen as the up and down arrow keys are pressed. In contrast, in one embodiment, a Virtual Channel Ad Slot, such as shown in tile 52, remains on the screen at all times as the up and down arrow keys are pressed, so the ad remains in view at all times.

Channel ads do not occupy a fixed area. Channel ads are essentially inserted between channels in the grid. If there are no Channel ads sold, the grid will simply be a continuous list of channels/show tiles with no gaps. As these channel ads take up a channel slot in the grid, it is desirable to limit how many are likely to appear on any one screen to ensure the Guide is a useful source of TV programming information. Typically, there will be approximately 1 Channel ad per hard page.

Channel ads are typically the height of a channel slot, the width of the grid and are intermingled with the channel listings. The usable area for a Channel ad is typically 24 pixels high×344 pixels wide, with 2 pixel wide bevels all around.

There are several types of Channel ads, including: Relative, Parent, and Fixed position Channel ads.

Relative Channel Ads appear in a position relative to the top of the grid and are spaced every n channel slots, where n is some number. These ads appear and disappear as the user pages through the Guide's hard pages. It is anticipated that n will usually (but not necessarily always) equal 9 since this is the number of channels in the PIP version grid. This would provide for one ad per hard page. A location for the first ad can be selected on the first page and subsequent ads follow every n channel slots. The same ad is repeated every $n^{th}$ slot. This method of repeating every $n^{th}$ channel slot is true for both PIP and non-PIP versions. Typically, as a user turns channels off, the spacing of these ads remains constant (every n channel slots). In the event that there are not enough channels to continue this spacing, ads will appear at the end of the grid listings.

Parent Channel ads are related to a specific channel located directly above the ad. A Parent Channel ad is attached to its adjacent "parent" channel (that is, the ad follows the parent channel). As it is desirable to limit the number of Channel ads seen on any one screen, the number of Parent ads will typically be limited. Additionally, if the parent channel is turned off, the ad will typically be displayed at the bottom of the grid.

Fixed Position Channel ads are located in one specific location, y (where y is some number) channels down from the top of the grid. If y is greater than the number of channels in the grid, the ad will be located at the end of the grid.

Except as noted above regarding Parent and Fixed Position Channel ads, Channel ads will typically be spaced so that no more than one Channel ad is displayed at one time.

In one embodiment, Channel ads page vertically along with the channel listing information. These ads remain in a fixed position when the grid is scrolled horizontally. The user can highlight these Channel ads just as any show title can be highlighted. When highlighted, these Channel ads display additional information in the info. box just as when any channel is highlighted.

Channel ads are typically surrounded by bevels just like any show tile. Channel ad highlighting is typically similar to Panel ad highlighting. In one embodiment, when a user highlights a Channel ad, the bevels change to a flat (non-beveled) yellow border. When a Channel ad show is set to record the border turns red (dark red when not highlighted, light/bright red when highlighted). When a Channel ad show is scheduled to watch, the border turns orange (dark orange when not highlighted, light/bright orange when highlighted).

In one embodiment, Channel ads can have multiple, sequential info. box "screens" of information. The availability of this additional information is indicated by an "i" icon. The user can access the additional information by pressing the info. button.

In one embodiment, if a Channel ad is highlighted, has show information associated with it, and the advertised show is currently on, the user may tune directly to the related program by pressing the Left Action button (the Blue button which is labeled "Watch") or by pressing the Enter/Select button on the remote. Pressing the Watch button also places the show in the Record/Watch Schedule for the duration of the show. If the show is not currently on, pressing the Left Action button places the show in the Record/Watch Schedule for future auto-viewing; pressing the Enter/Select button tunes to the channel related to the show in the Channel ad. Shows added to the Record/Watch Schedule may be set to be viewed: once, daily, or weekly. The Watch feature and related Action button labels operate in the same way as if scheduling a show to watch from the Grid.

In one embodiment, if a Channel ad has show information associated with it, the show may be recorded by highlighting the ad and pressing the Right Action button (the Green button, labeled Record). If the show is already being delivered in the television signal, recording begins immediately and the show is placed in the Record/Watch Schedule for the duration of the show. If the show is on in the future, the show is added to the Record/Watch Schedule for recording. Shows added to the Record/Watch Schedule may be set to be recorded: once, daily, or weekly. The Record feature and related Action button labels operate in the same way as if recording a show from the Grid.

Channel ads can be dynamic.

5. Placeholder Ads

In one embodiment, when the Guide is first setup, the initial download of information will not have been received. The Panel ad spaces must be filled with Placeholder ads that are stored in ROM. These ads must be "timeless" as they will appear each time a TV is set up, either for the first time or after a power outage.

One use for the Panel ad space is for help text. Help text that draws the user to select the ad space could serve as a "tutorial" on how to access Panel ads, the additional information on info. screens, and how to Watch and Record from ads.

6. Full Screen Ads.

When the viewer first enters the EPG, the EPG can display a full screen ad, such as an ad that would be displayed in the Ad Window. The viewer can interact with the full screen ad in the same manner in which the viewer can interact with the Ad Window. That is, the viewer can instruct the EPG to record, or to add to the watch list, the infomercial or program, if there is one, that is associated with the advertisement.

7. Automatic Watch Channel.

Rather than have the last channel watched as the first channel tuned the next time that the viewer turns on the television, a channel selected by the viewer could be automatically tuned. In one embodiment, the viewer indicates the Automatic watch channel in the Watch List Function of the EPG. In another embodiment, a broadcaster sends an on-screen query to each viewer to enter a command if the viewer wants the broadcaster's channel to be the first watched channel when the viewer first turns on the television.

8. Ad Features.

Ads may feature, among other things, a graphics field, a text field or a combination of a graphics and text field.

Graphics are typically presented in 8 bit/pixel (using "320 mode"), 4 bit/pixel (in "640 mode") and 1 bit/pixel images. In some embodiments, there will be memory limitations. In embodiments with such memory limitations, it is expected that Panel ads will contain graphics no larger than 25% of the ad area when 4 or 8 bit/pixel graphics are used. 100% of the area may be used for a 1 bit/pixel graphic. Channel ad graphics will typically, but not necessarily, be limited to the channel logo portion of the ad. (The use of the word "typically" here, and elsewhere in this application, means "typically, but not necessarily.") The remaining portion of the Channel ad will typically be text only.

Displayed text will typically have the following characteristics:
- available normal and condensed 18 and 24 point fonts
- oblique version of the fonts
- underlining
- bold
- centering
- left and right justification
- color can be selected once per line
- Text could also be displayed as a 1 bit/pixel bitmap in the Panel ad areas only.

Background colors will have an impact on the overall look and usability of the Guide. The following describes a typical embodiment.

Panel ad background colors may be selected by the advertiser and will typically be subject to luminance constraints set forth below.

Channel ad background colors may be restricted. Show tile background colors are used as keys for show categories (movies, sports, etc.) and actions taken on a show (set to record or watch). While most any background color could be displayed it is desirable to maintain the integrity of the show tile color schemes. Therefore, it is likely that a limited set of background colors or a set of colors which can not be used will be specified for advertising agencies to use when developing Channel ad creative. Channel ad backgrounds will typically be subject to luminance constraints set forth below.

The Info. box background will typically be gray and typically can not be changed by the advertiser.

There are typically limitations on the luminance of the colors in the ads. If the luminance is set too high, the screen image will blister. These limitations will be set, according to the embodiment, and communicated to the advertisers for their development consideration. Ads that do not comply with luminance restrictions for the particular embodiment will be subject to default override limitations.

In one embodiment, the viewer can interact with the ads and the television. For instance, Tune-in ads will allow the viewer to tune directly to a show in progress from a highlighted ad block assuming the ad block has program information associated with it. An in progress show associated with an ad is directly tuned by pressing either the Enter/Select button or the Left Action button (the Blue button labeled "Watch").

Direct-record ads will allow the user to record a show in progress or scheduled to be on in the future from a highlighted ad block. There is no practical limit on how far into the future a direct-record associated show may be scheduled to air. A show associated with an ad is recorded by pressing the Right Action button while the ad is highlighted. The user may select a record frequency of once, daily or weekly. From an ad, the user presses the Right Action button (the Green button labeled "Record") to place the show in the Record Schedule. In the event that the show is currently on, pressing the Right Action button while highlighting an ad allows recording of the show in progress. The show title is also placed in the Record Schedule until the show ends in the event the user wishes to modify the record frequency to daily or weekly.

Watch ads consist of a program advertised in any ad space. The program advertised may be placed into the Watch Schedule as long as the ad block has program information associated with it. There is no practical limit on how far into the future an associated show may be scheduled to air. The Watch feature operates much the same way as the Record feature, except that it tunes the television ("TV") to the show rather than recording it. If a user is watching TV, the channel automatically changes to a show placed in the Watch Schedule when the show begins. If the TV is turned off when a show in the Watch Schedule is scheduled to begin, the TV is turned on and tuned to the desired channel (TV implementations only, not VCR.) The user may select a watch frequency of once, daily or weekly. From an ad, the user presses the Left Action button (the Blue button labeled "Watch") to place the show in the Watch Schedule. In the event that the show is currently on, pressing the Left Action button while highlighting an ad results in tuning directly to the show. The show title is also placed in the Watch Schedule until the show ends in the event the user wishes to modify the watch frequency to daily or weekly.

Ads may have multiple levels of information. Typically, First Level Information is the ad copy and/or graphics that are presented on screen with no user action. This comprises the Panel and Channel ad areas.

Typically, Second Level Information (if provided by the advertiser) is automatically made visible ("Auto-Open") when the user highlights an ad block by scrolling onto it. This secondary information is presented in the info. box when a Channel ad is selected and in an automatically expanded version of the info. box that covers the entire channel grid area when a Panel ad is highlighted. The "i" icon on the ad, placed at the advertiser's discretion, indicates there is more information available for that ad. The second level information may be text and/or graphics depending on memory availability.

Typically, Third Level Information (if provided by the advertiser) availability is indicated by the info. button "i" on a Second Level information screen. Pressing the info. button accesses this information and cause the information box to expand for Channel ads to cover the entire grid area. This information can be multiple pages long. Pressing the info. button successive times cycles the user through the multiple pages. Pressing the info. button from the last available screen causes the information box to contract to its original size for all ads. The third level information may be text and/or graphics depending upon memory capabilities.

Ad Blocks can be dynamic. Memory permitting, the Panel ad graphics and/or text and information box text may change every X (where X is some number) seconds rotating through a limit of N (where N is some number) different graphical or textual executions. There is the capability to limit the number of dynamic ads displayed at any one time.

Ad duration and start time/end time can be scheduled and/or dynamic. In one embodiment, ads are to be displayed at a given start time with a related end time. The time between the start and end is the ad's duration. The minimum duration increment is typically 60 seconds. In one embodiment, an ad will not be replaced automatically when an ad's end time arrives. Ads will only change when the user's actions cause a new "hard page," or new section of the guide to appear (e.g. going from the Grid to Sort).

Ads can rotate. For example, different ads can appear each time the user enters the same page/section of the Guide. There is no hard limit on the number of ads placed in rotation. Ads can be assigned a priority with the ad of the highest priority being displayed the first time a hard page or section is accessed. Then the second priority ad is displayed the next time the user views this page and so forth. The priority counter is page dependent, meaning that if the user views the first page for a third time, they will see the third priority ad on that page and if they then scroll to the second page for the first time, they will see the first priority ad on the second page.

Ads may differ by the section of the Guide being viewed. For example, if a user is viewing the Sports theme area, an ad for ESPN Sports Center may appear, whereas a different ad was presented when the user was on the main grid.

The EPG can determine which advertisements to display depending upon the advertisement being displayed on the television channel that the viewer was watching immediately before entering the EPG. That is, if a Toyota advertisement was being shown on the channel that the viewer was watching at the time that the viewer entered the EPG, then the EPG can be timed to display a correlative Toyota advertisement in some portion of the EPG, e.g., the Ad Window. a television program.

In one embodiment, the EPG tests the Viewer Profile to determine which ad to display at various times during the viewer's session with the EPG. The EPG can assign Ad and Page priorities to represent the advertisers' investment and the relative viewer's profile.

Graphically dynamic ads typically present different graphics every x seconds (where x is some number, with x as small as 1.0 second) rotating through n (where n is some number) graphical or textual executions. Typically, only a limited number of these ads will be displayed at any one time (likely a maximum of 1 per screen) as busy screens will decrease the effectiveness of the ads and the utility of the Guide.

Ads must be "identifiable" and "accessible" once placed in memory in order to allow advertisers to "pull" an ad, to update an ad, or to correct errors in transmission.

G. Improved Product Information Access by the Viewer

1. Ad Window Product Detail.

The viewer can highlight the Ad Window to locate additional information about the product advertised. In one embodiment, the viewer highlights the Ad Window by pressing the arrow/directional navigational keys of the remote control device to navigate the remote control device pointer to the location of the Ad Window on the on-screen television monitor display. When the remote control device pointer is located at the Ad Window on the on-screen television monitor display, the on-screen display of the Ad Window will be highlighted. In one embodiment, the color of the Ad Window itself will become brighter or show a lighted effect. In another embodiment, the color of a border surrounding the Ad Window will become brighter or show a lighted effect. Highlighting the Ad Window will cause additional text describing the product to be displayed in the detail box are of the EPG Grid Guide. Alternatively, the EPG provides the producers of infomercials with the opportunity to provide the viewer with the opportunity to view a video clip about the product being advertised.

The Ad Window can be optionally interactive. The Internet address of a web site containing information relevant to the ad being displayed in the Ad Window can be displayed in the Ad Window as a web site address, as an icon, or in some other graphical presentation, such as a stylized "i" indicating additional interactive information. Furthermore, the viewer's interaction with the Ad Window will be monitored by the EPG to record as part of the viewer's profile.

2. Ad Window Product-Related Recording

The EPG provides viewers the opportunity to access extended product information about which the viewer is interested. Because of the cost of buying advertising time, a growing number of product manufacturers and marketers produce infomercials about their products. Because of the cost of air-time, many manufacturers and marketers buy relatively inexpensive air time for their infomercials according to off-prime-time schedules, often on non-prime channels. The EPG provides the viewer the opportunity to record an infomercial that is broadcast at a time, or on a channel, that would be inconvenient for the viewer to watch real-time. If the Ad Window displays information about a particular product, pressing a record button will instruct the EPG to record an infomercial, to the extent that one is scheduled for a future time. Alternatively, the viewer can designate the infomercial for the Watch List.

3. Ad Window Program-Related Recording

The EPG provides viewers with additional opportunities to instruct the EPG to record or watch a future-scheduled television program. The Ad Window can display information about a future-scheduled television program. If the viewer is interested in recording the program, the viewer can instruct the EPG to record the future-scheduled program. In one embodiment, the viewer presses record button on the remote control device to instruct the EPG to record the future-scheduled program. Alternatively, the viewer can instruct the EPG to add program to the Watch List. Alternatively, the viewer can view a video clip about the program.

H. Creation of a Viewer's Profile

1. Collecting Viewer Profile Information.

The EPG requests that the viewer provide certain profile information, including but not limited to: the viewer's zip code; television, cable, and satellite services to which the viewer subscribes; the length of said subscriptions; the type of television; the age of the television; where the television was purchased; the viewer's top favorite channels; the viewer's favorite types of programs; and the times during which the viewer is most likely to watch television. If the viewer declines to provide this information, the EPG will attempt to "learn" the information as described below.

In one embodiment, the EPG is capable of distinguishing between individual viewers and develops individualized profiles. For instance, in one embodiment, each viewer has an individual PIN or other identification number. In another embodiment, each viewer uses an individualized remote. In yet another embodiment, there is an absence of a way to distinguish one viewer from another. In that case, the profile is developed for the "family."

Every time the viewer interacts with the EPG or the television, the EPG records the viewer's actions and the circumstances surrounding those actions. For instance, when the viewer changes channels, the EPG records, among other things, information about the first channel, the changed-to channel, the time that the change was made, the identification of the programming that was displayed on the first channel, the identification of the programming that was displayed on the changed-to channel, the time of the change, the identification of any advertisement that was displayed on the first channel at the time of the change, the identification of any advertisement that was displayed on the changed-to channel, and whether the viewer changed channels while in one of the EPG modes, as opposed to being in the television mode. The EPG will also record every instruction by the viewer to record or watch a program, whether the instruction is Once, Daily, Weekly, or Regularly. The EPG will also record whether the viewer changes the volume of the television audio, and if so, what circumstances surrounded the change in volume. If the viewer changes channels while in one of the EPG modes, then the EPG records information about what was displayed in each of the windows of the EPG UI before and after the change.

The EPG also records information when there is an absence of interaction between the viewer and the television or the EPG. For instance, the EPG will record whether a viewer continues to view an advertisement rather than changing channels. The EPG calculates and records the entire duration of the time that the television is on in any particular day.

The EPG also records information surrounding the viewer's interaction with external sources of information, such as the Internet. For instance, the EPG records each search query criteria initiated by the viewer, the Search Engine used to make the search, the items selected by the viewer from the search response, interaction by the user with Internet sites, and viewer interactions with the EPG during the same timeframe as the viewer interacts with the Internet.

An alternative to the above-described individual viewer profile information collection would be to provide on-screen survey queries. That is, the EPG could display an offer onscreen that would tell the viewer to call a toll-free number for the purpose of reading an on-screen encrypted number for the survey in exchange for a gift certificate. The offer could be made only to viewers watching a particular program or particular advertisement at a particular time. Survey responses would provide useful information further survey customization, customizing the guide, and targeting advertising.

2. Analyzing and Characterizing Viewer Profile Information.

The viewer profile information (data collected concerning, and surrounding, a viewer's interaction with the television, the EPG (including the recording and watching functions), the Internet, the World Wide Web, and any other sources of information external to the EPG, but through which the viewer interact)) can be sent to a computer at the head end of television distribution for analysis, or in the alternative, can be analyzed by the EPG.

Information about the viewer is captured on an ongoing basis. Similarly, viewer profile data is updated on an ongoing basis. Accordingly, the viewer profile analysis program (the "Profile Program"), can be repeated at some time interval to incorporate additional information about the viewer that has been captured since the last analysis. Alternatively, the Profile Program is a real time program that processes each discrete item of information about a viewer as the data is captured.

The viewer profile analysis program (the "Profile Program"), may be resident at the head end, in the Internet, included as part of the EPG, or distributed among these various possible locations. The Profile Program performs a variety of different types of analysis on the viewer profile data. For instance, the Profile Program performs simple statistical analysis of the data collected. The Profile Program accumulates, among other things, the number of times that the viewer: interacted with the EPG during a particular viewing session; performed particular types of interactions with the EPG; watched a particular channel; interacted with the Internet during a particular viewing session, interacted with a particular website; watched and/or recorded and/or scheduled to watch a program with a particular type of theme (e.g., comedy, sports, drama, movie, sitcom, science fiction, adventure, mystery, documentary, cooking, travel, etc.); and watched and/or recorded and/or scheduled to watch a program with a particular type of subject (e.g., golf, tennis, football, basketball, baseball, animals, food, etc.), or a particular actor or actress. The Profile Program also calculates the duration of each viewing and compiles, among other things, statistics about the times of day and days of the week during which the viewer watches television, interacts with the EPG, or interacts with the Internet or the World Wide Web.

Using the basic viewer profile data and the simple statistics collected about a particular viewer, the Profile Program "learns" to recognize a finer breakdown about the various types of data collected and then uses the learned information to describe a "Viewer Preference.". For instance, if the Profile Program detects that the viewer watches sports programs, and that a number of sports programs are basketball games, the Profile Program analyzes the teams involved in the programs watched. The Profile Program is able, in this manner, to determine whether the viewer is a fan of a particular team. If so, the Profile Program records the viewer's team affiliation as a Viewer Preference.

The Profile Program performs multiple levels of sophisticated analysis and learning involving numerous comparisons of the basic viewer profile data and the simple statistics collected about a particular viewer to develop Viewer Characteristics. In this way, the Profile Program develops a multi-dimensional profile of the viewer. For example, once the Profile Program detects a Viewer Preference, the Profile Program compares, e.g., the number of times that the viewer interacts with the EPG or an external information source such as the Internet/World Wide Web, during a telecast of a program that relates to the Viewer Preference (e.g., a basketball game involving the viewer's favorite team) with, e.g., the number of times that the viewer interacts with the EPG or an external information source such as the Internet/World Wide Web, during a telecast of a program that does not relate to the Viewer Preference.

Further, the types of interactions in both sets of circumstances are analyzed. In this way, the Profile Program determines Viewer Characteristics relating to, among other things: attention span; general interest in product advertisements; interest in specific types of product information; propensity for impulse buying; correlation of impulse buying habits to price ranges, product types, and advertising formats; interest in recording and/or watching future-scheduled programs; interest in accessing additional levels of information concerning television programs; and interest in accessing additional levels of information concerning product advertisements including the correlation of such interest with the Viewer Preferences. Over time, with sufficient data, the EPG characterizes the viewer's sense of humor, chronological age, activity age, whether the viewer is married, whether the viewer has children, whether the viewer has a pet and what type of pet the viewer likely has, whether the viewer is interested in buying a particular type of appliance, whether the viewer is considering buying a car, the viewer's likely political affiliations, and a broad range of various other Viewer Characteristics.

Yet further, the Profile Program analyzes an individual's Viewer Profile as compared to the Viewer Profiles of others. With this cross-comparison analysis, the Profile Program can determine the likelihood that the subject viewer will prefer or be interested in a particular subject, product, theme, movie, episode, etc. based on comparisons to similar Viewer Profiles.

I. Utilization of Viewer Profile Information to Customize Various Aspects of the EPG The EPG and Profile Program use the basic viewer profile data, the simple statistics collected about a particular viewer, Viewer Preferences and Viewer Characteristics (collectively, hereinafter, the "Viewer's Profile") to customize various aspects of the EPG. The viewer has the option to block any of these automatic customization features in the EPG Setup Mode. One aspect of the EPG that will be customized is the order of the channel slots presented in the Grid Guide. The order in which the channel slots are presented can be customized to present the viewer's favorite channels at the top/beginning of the Grid Guide in descending order according to the Viewer's Profile.

In one embodiment, the order of the channel slots is customized according to the day of the week and the time of day in accordance with the Viewer's Profile. For instance, if a particular viewer frequently watched Nick at Nite on weekday evenings from 7 pm to 10 pm, then the EPG automatically tunes the television when turned on between 7 pm and 10 pm, to the appropriate Nick at Nite channel and formats the Grid Guide to show the Nick at Nite channel as the first channel in the Grid Guide. If the same viewer typically watched ESPN during daytime hours on Saturday and Sunday, then the EPG automatically tunes the television when turned on between, e.g., 7 am through 7 pm on Saturday and Sunday to one of the ESPN channels and formats the Grid Guide to show the ESPN channels as the first several channels in the Grid Guide whenever the viewer enters the Grid Guide between, e.g., 7 am through 7 pm on Saturday and Sunday.

At the viewer's option, the EPG and Profile Program use the basic viewer profile data, the simple statistics collected about a particular viewer, Viewer Preferences and Viewer Characteristics to perform automatic surfing. At the viewer's option, auto surfing can be performed during real-time advertising telecasts. At the viewer's further option, auto surfing can be performed in PIP Watch Function, allowing the viewer to watch the program currently tuned in the main Picture Window, while providing auto surfing in the PIP Window. Alternatively, at the viewer's option, auto surfing can be performed in PIP Watch Function, allowing the viewer to watch the program currently tuned in the PIP Window, while providing auto surfing in the Main Picture Window. Still further, the viewer can choose the option of selecting a different advertisement to watch, or manually surfing channels of the viewer's choice.

At the viewer's option, the EPG and Profile Program use the basic viewer profile data, the simple statistics collected about a particular viewer, Viewer Preferences and Viewer Characteristics to populate the Record List and/or the Watch List with programs that are likely to suit the viewer's interests. In one embodiment, searches for this type of information are conducted at a central computer at the head end. In another embodiment, queries are constructed and fed to an Internet search engine.

At the viewer's option, the EPG and Profile Program use the basic viewer profile data, the simple statistics collected about a particular viewer, Viewer Preferences and Viewer Characteristics to search for news stories that are likely to suit the viewer's interests. The problem that is solved is automatically (without an editorial staff) choosing news stories from multiple news feeds for display to a particular viewer in a news service. The content of the audio portion of the news broadcast is digitized and can be stored at a central computer, on one or more web sites, on DVD's (both video and audio recordings) local to the particular viewer's television system, or in memory at the particular viewer's television system. In addition to the audio content, video recordings of the news stories can also be stored.

The Viewer's Profile, and in some embodiments, specific input from the viewer, is then used to construct data-mining search queries to locate and deliver content that matches the viewer's profiled interests and/or the viewer's specific requests for information. The news stories are then indexed (as described elsewhere in this disclosure). The EPG presents the viewer with the customized index. In this way, the viewer selects the news stories for viewing in much the same way as the viewer selects television programs that the viewer wants to watch or record. Furthermore, web sites containing additional information concerning the indexed news stories can be posted, e.g., as part of the detailed description area text presented at the time that the viewer highlights a particular news story for viewing.

In one embodiment, Theme Guides provide "Smart Sorting" based on the Viewer's Profile (which is explained more fully elsewhere in this application). That is, if a program is on two channels, the system will select the best channel based on which of the two channels the viewer watches more often. In one embodiment, the Theme Guides are further customized according to the Viewer's Profile. For instance, an information broadcast packet sent with the scores is used to order the score in the sports guide consistent with the Viewer's Profile. For instance, the score for a game involving the Boston Red Sox would display the scores for the Red Sox first for a viewer in Boston.

During set up procedures, the EPG provides for automatic channel map selection. All channel maps in the viewer's zip code are downloaded. Zip code related options are displayed. In one embodiment, the viewer is asked to identify information necessary for the television to select the appropriate channel mapping option, but the television automatically selects the appropriate channel map. For instance, the viewer is asked to identify, e.g, the distribution service to which the viewer subscribes, e.g., Colonial Cable, and a particular channel map, e.g., does the viewer receive HBO on channel 43. In this way, the viewer identifies the information necessary for the television to select the appropriate channel map. Alternatively, the viewer is actually asked to select the channel map, e.g., "if you have Colonial Cable and get HBO on channel 43, pick this channel map."

J. Utilization of Viewer Profile Information to Provide Customized Presentation of Advertising to the Viewer The EPG and the Profile Program use Viewer Profile information to tailor the presentation and scheduling of advertisements to the viewer and to customize the presentation of the EPG for the user. For instance, the EPG uses Viewer Profile information to determine whether to notify the viewer about scheduling for a program involving the viewer's favorite team, a talk show involving a star player from that team, etc. The EPG is capable of such customized notification/advertisement through e.g., an advertisement in the Ad Window, or through an advertisement in a Virtual Ad Channel Slot.

Additionally, the EPG and the Profile Program use Viewer Profile information to customize the presentation and/or scheduling of telecast advertisements that are viewable during the real time telecast of the television program that the viewer is watching. One example is customizing an overlay message to an advertisement on a local geographic basis. For instance, the EPG knows the geographic location of the individual viewer. The broadcaster can packet match on the zip code to customize the message so each zip code gets a different message, i.e., the 3 Burger Kings in the viewer's local area. In one embodiment, the customized messages can be preloaded by zip code into the memories of particular viewers' EPG's. The preloaded messages can be transmitted by a head end during off hours and stored in the viewer's terminal for use when the advertisement runs, e.g., during a television program or in a video clip in the Ad Window. The electronic trigger to run the message can be transmitted along with the television signal in real time and can identify the messages stored in the user terminal that need to be applied.

In another embodiment, the customized messages are narrowcast with the televised advertisement. One way to narrowcast the customized messages is to embed the customized information in the advertisement video stream. Another way is to transmit a digital "watermark" in the video stream of the advertisement.

In one embodiment, customization of real-time viewing of advertisements is achieved by providing multiple channels of advertising, by tuning the television automatically to a particular advertising channel at the time during the telecast of the television program during which an advertisement is scheduled to occur, and by then tuning the television back to the viewer's chosen television program at the conclusion of the advertisement. In another embodiment, a service monitors telecasts for advertisements as they are telecast on a particular channel and inserts a change channel command in the Vertical Blanking Interval (the "VBI") when an ad is telecast, said change channel command causing the television to tune to a particular channel for a telecast of an advertisement suitable to the Viewer's Preferences.

Viewer Profile information can be reported, as with, for instance, statistical reports of Viewer Profile information for many viewers. These reports could be provided for analysis by advertisers, head end operators, Guide producers, or others, to determine, among other things, marketing customization opportunities, narrowcasting opportunities, program detail information requirements, and program distribution scheduling requirements.

The EPG will attempt to capture the approximate initial purchase date (e.g., first turn-on date) of any television/entertainment system components. The EPG can notify the user at the appropriate time after the initial purchase of opportunities such as purchasing an extended warranty from the manufacturer. In one embodiment, the terminal equipment is separately addressable providing that such notification messages can be sent in the VBI to the appropriate viewer. Based on the Viewer Profile, the extended warranty offer could be tailored to the viewer's financial situation.

Another way that the EPG uses Viewer Profile information is in connection with "access-content" customization of the advertising messages displayed by the EPG. Viewer Profile information will include the television program that the viewer was watching immediately before entering the EPG. The EPG can display different ads in the Guide or Service based upon the content of the television program that the viewer was watching before entering the EPG or one of the special data services accessible through the EPG. The "access-content" advertising strategy provides a much more refined way of targeting the consumer. For example, consider two viewers who are both watching television at 8:00 p.m. on a Tuesday night. When the one viewer who has been watching "Nova" enters the EPG, the EPG might display an advertisement for educational computer; whereas when the second viewer who has been watching Major League Baseball enters the EPG, the EPG might display an advertisement for Goodyear Tires.

In one embodiment of this invention, a data base of advertising messages and virtual channel ads is stored in RAM at the viewer terminal or is accessible at a web site if the viewer terminal has an Internet connection. In either case, the advertising items in the data base are labeled with coded categories that correspond to coded category labels assigned to the telecast television programs. (Preferably, these are the same categories that are used to sort the programs in the on screen category or theme guide.) The category labels of the television programs could be stored in RAM as part of the EPG data base and retrieved from the applicable Show Information Package ("SIP") based on the information from the real time clock and the tuner setting. This information identifies a time and channel that points to the applicable SIP. After the category label of the last program the viewer was watching in the television mode is retrieved from the EPG data base, this label is matched to the corresponding label in the data base of advertising messages and virtual channel ads stored in RAM. In FIG. 1 of the drawing, the advertising items to which the labels are attached are displayed in ad windows 14 and 16 and the virtual channel ad displayed on tile 52 as described above.

Yet another way that the EPG uses Viewer Profile information is in connection with "adjacent-content" customization of the advertising messages displayed by the EPG. Viewer Profile information will include identification of the content that the viewer has currently highlighted in the EPG or related data service. Using this method, the EPG displays different advertisements depending upon, e.g., which show the viewer has currently highlighted in the Grid Guide, what sport is highlighted in a sports data service, or what type of news is highlighted in a news service (international, local, etc.).

The EPG can select advertisements from various possible locations, including but limited to: a library of advertisements stored at the viewer's terminal in RAM that have been downloaded through the VBI, stored at the head-end, or accessible through an EPG link to the Internet/World Wide Web. The advertisements may be in the form of graphics, text, video clips, audio clips, and combinations thereof. Each advertisement can be assigned theme codes, profile codes, and other selection intelligence. In one embodiment, in order to customize the advertising display, the EPG searches the library of available advertisements to locate advertisements that match criteria set by the advertisers for "access content," "adjacent content," and/or Viewer Profile information. In another embodiment, the EPG selects advertisements for display according to pre-established selection criteria.

The disclosures of the following patent applications are incorporated fully herein by reference: International Application WO96/07270; Application No. 60/053,330 filed Jul. 21, 1997; Application No. 60/061,119 filed Oct. 6, 1997; and Application No. 60/055,237 filed Aug. 12, 1997.

In one embodiment, the advertisements in the library are assigned to themes; the history of use of an on-screen theme menu or program guide is recorded; and the history is analyzed by the EPG microprocessor to decide which advertisement to display.

Figure 7:
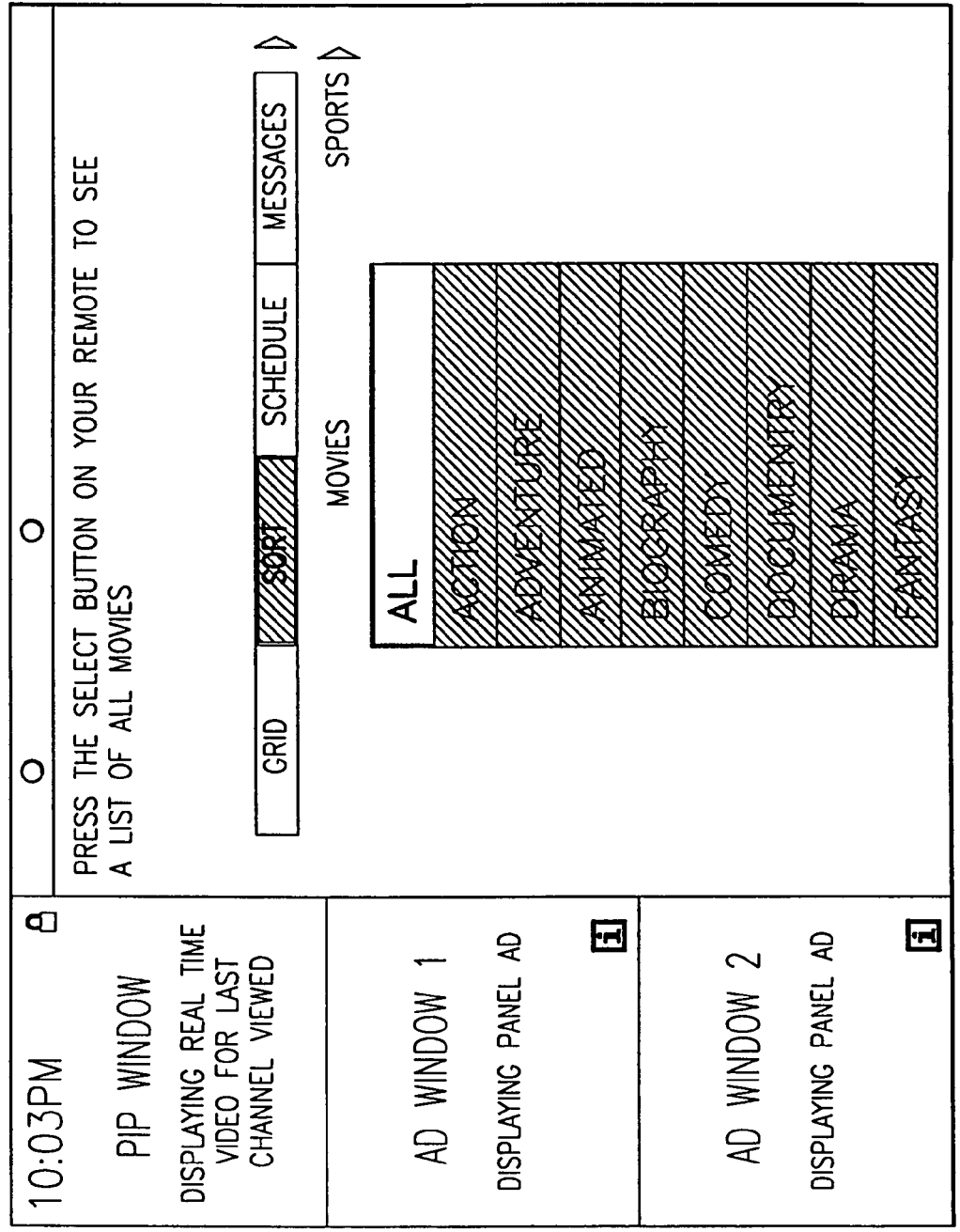
FIG. 7 is a graphic representation of a sample on screen EPG display depicting the top level theme screen display of the EPG.

For example, a particular advertisement for automobiles might be assigned to a sports event theme. In a simple implementation, this automobile advertisement would be selected for display, if the users of the particular EPG selected sports as a theme more frequently than any other theme during a prescribed period of time. FIG. 7 represents the on screen display for the top level theme screen; and FIG. 8 represents the on screen display for the second-level theme screen. A theme selection could be recorded when a viewer highlights a theme in FIG. 7, such as "Sports". Selecting a theme brings up a screen listing, by time, channel, and title, of the programs that are consistent with the selected theme on a second-level theme screen, an example of which is shown in FIG. 8. The history of use could be recorded in a memory by overwriting the oldest data stored in the memory. If desired, a more sophisticated analysis could be used. Thus, the frequency of selection could be weighted to favor more recent selections over older selections or themes could be combined to determine which advertisement to display.

In another embodiment, the advertisements in the library are assigned to particular television programs or classes of television programs; the history of use of the information box of the EPG is recorded, in terms of frequency of the visits, time spent during a single visit, and/or total time of all the visits; the information boxes are correlated to the television programs, and the results are analyzed to decide which advertisement to display. Instead of the information box, any other area of the EPG screen could be monitored in similar fashion to decide which advertisement to display. In each case, the advertisements in the library are assigned to the types or subjects of information displayed in the monitored area so as to target better the advertisements to the interests of the users.

In another embodiment, the advertisements in the library are also assigned to particular television programs or classes of television programs in terms of channel and time; the tuner is monitored; the channel and time are correlated to the television programs, and the results are analyzed to decide which advertisement to display.

For example, an advertisement for brand name athletic shoes with a popular basketball star could be assigned to basketball programs. The shoe advertisement would be selected for display if the viewer of the particular EPG entered the EPG while watching a basketball game.

In another embodiment, the advertisements in the library are also assigned to particular television programs or classes of television programs; the history of television programs entered into a "record-watch list" as shown in FIG. 6 is recorded; and the results are analyzed to decide which advertisement to display.

The time of the monitored event can also be taken into account in order to distinguish between multiple users of the same EPG or related television receiver. The assumption is that the people using the EPG and watching television at different times of the day have different interests—housewives may use the EPG more in the morning, children may use it in the early evenings, and men who work outside the home may use it on Sunday afternoons.

History of use as described above can be combined with the "access-content" model described in Application No. 60/055, 237 to further pin-point advertisements to the user's interests. Thus, if the users of the particular EPG selected comedies as a theme more frequently than any other theme during a prescribed period of time, three advertisements might be flagged and the final selection made therefrom depending upon which type of program the viewer was watching on television before switching to the on-screen EPG.

What is claimed is:

1. A method for causing advertisements to be displayed with an electronic program guide (EPG) comprising:
   automatically monitoring a plurality of user interactions with user equipment;
   transmitting information related to the automatically monitored interactions to a remote computer;
   receiving, from the remote computer, a list of recommended programs that the user is likely to be interested in, wherein the recommended programs are identified for inclusion in the list based on user characteristics determined from the transmitted information;
   generating for display with the EPG a plurality of program listings corresponding to the list of recommended programs;
   receiving an advertisement matching the transmitted information; and
   causing the received advertisement to be displayed with the EPG simultaneously with the plurality of program listings.

2. The method of claim 1 wherein causing the received advertisement to be displayed with the EPG simultaneously with the plurality of program listings comprises causing the received advertisement to be displayed in a panel advertisement window adjacent to the plurality of program listings.

3. The method of claim 1 wherein causing the received advertisement to be displayed with the EPG simultaneously with the plurality of program listings comprises causing the received advertisement to be displayed within the plurality of program listings.

4. The method of claim 3 wherein at least a portion of the plurality of program listings are arranged in a plurality of rows, and the received advertisement is displayed between two of the rows.

5. The method of claim 4 wherein the plurality of rows each has a vertical height, and the received advertisement is displayed with substantially the same vertical height as at least one of the rows.

6. The method of claim 4 wherein the plurality of rows each has a horizontal width, and the received advertisement is displayed with substantially the same horizontal width as at least one of the rows.

7. The method of claim 4 wherein the plurality of rows each has a horizontal width and a vertical height, and the received advertisement is displayed with substantially the same horizontal width as at least one of the rows and substantially the same vertical height as at least one of the rows.

8. The method of claim 1 wherein generating for display with the EPG the plurality of program listings comprises generating for display time, channel, and date information for each of the plurality of program listings.

9. The method of claim 1 further comprising activating the displayed advertisement to invoke a function.

10. The method of claim 1, wherein:
the automatically monitored user interactions comprise user selections of program themes;
the user characteristics comprise a favorite program theme;
the received advertisement is associated with the favorite program theme; and
the plurality of program listings correspond to programs associated with the favorite program theme.

11. The method of claim 1, wherein the user characteristics comprise demographic information determined based on the automatically monitored user interactions.

12. The method of claim 1, wherein the recommended programs are identified for inclusion in the list based on a comparison of the user characteristics determined from the transmitted information and user characteristics of a second user.

13. The method of claim 1, wherein the received advertisement is additionally selected based on the list of recommended programs.

14. The method of claim 1, wherein the received advertisement, the recommended programs and the user characteristics are associated with a particular subject matter.

15. An electronic program guide (EPG) system for causing advertisements to be displayed comprising:
control circuitry configured to:
automatically monitor a plurality of user interactions with user equipment;
transmit information related to the automatically monitored interactions to a remote computer;
receive, from the remote computer, a list of recommended programs that the user is likely to be interested in, wherein the recommended programs are identified for inclusion in the list based on user characteristics determined from the transmitted information;
generate for display with the EPG a plurality of program listings corresponding to the list of recommended programs;
receive an advertisement matching the transmitted information; and
cause the received advertisement to be displayed with the EPG simultaneously with the plurality of program listings.

16. The system of claim 15 wherein the received advertisement is simultaneously displayed in a panel advertisement window adjacent to the plurality of program listings.

17. The system of claim 15 wherein the received advertisement is simultaneously displayed within the plurality of program listings.

18. The system of claim 17 wherein at least a portion of the plurality of program listings are arranged in a plurality of rows, and the received advertisement is displayed between two of the rows.

19. The system of claim 18 wherein the plurality of rows each has a vertical height, and the received advertisement is displayed with substantially the same vertical height as at least one of the rows.

20. The system of claim 18 wherein the plurality of rows each has a horizontal width, and the received advertisement is displayed with substantially the same horizontal width as at least one of the rows.

21. The system of claim 18 wherein the plurality of rows each has a horizontal width and a vertical height, and the received advertisement is displayed with substantially the same horizontal width as at least one of the rows and substantially the same vertical height as at least one of the rows.

22. The system of claim 15 wherein each of the plurality of program listings comprises time, channel, and date information.

23. The system of claim 15 wherein the control circuitry is further configured to invoke a function in response to receiving a user selection of the displayed advertisement.

24. The system of claim 15, wherein:
the automatically monitored user interactions comprise user selections of program themes;
the user characteristics comprise a favorite program theme;
the received advertisement is associated with the favorite program theme; and
the plurality of program listings correspond to programs associated with the favorite program theme.

25. The system of claim 15, wherein the user characteristics comprise demographic information determined based on the automatically monitored user interactions.

26. The system of claim 15, wherein the recommended programs are identified for inclusion in the list based on a comparison of the user characteristics determined from the transmitted information and user characteristics of a second user.

27. The system of claim 15, wherein the received advertisement is additionally selected based on the list of recommended programs.

28. The system of claim 15, wherein the received advertisement, the recommended programs and the user characteristics are associated with a particular subject matter.

* * * * *

UNITED STATES PATENT AND TRADEMARK OFFICE
CERTIFICATE OF CORRECTION

| | | Page 1 of 1 |
|---|---|---|
| PATENT NO. | : 8,448,209 B2 | |
| APPLICATION NO. | : 11/894765 | |
| DATED | : May 21, 2013 | |
| INVENTOR(S) | : Ward, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this
Nineteenth Day of May, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,448,209 B2 | Page 1 of 1 |
| APPLICATION NO. | : 11/894765 | |
| DATED | : May 21, 2013 | |
| INVENTOR(S) | : Ward, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this
Third Day of November, 2015

Michelle K. Lee
*Director of the United States Patent and Trademark Office*